(12) United States Patent
Bhatelia et al.

(10) Patent No.: US 11,602,726 B2
(45) Date of Patent: Mar. 14, 2023

(54) STRUCTURED PACKING

(71) Applicant: Curtin University, Bentley (AU)

(72) Inventors: Tejas Jagdish Bhatelia, Forrestfield (AU); Biao Sun, Beckenham (AU); Ranjeet Pandurangrao Utikar, Canning Vale (AU); Vishnu Kumar Pareek, Willetton (AU); Geoffrey Michael Evans, Hamilton (AU); Moses Oludayo Tade, Waterford (AU)

(73) Assignee: Curtin University, Bentley (AU)

( * ) Notice: Subject to any disclaimer, the term of this patent is extended or adjusted under 35 U.S.C. 154(b) by 0 days.

(21) Appl. No.: 17/273,588

(22) PCT Filed: Sep. 6, 2019

(86) PCT No.: PCT/AU2019/050963
§ 371 (c)(1),
(2) Date: Mar. 4, 2021

(87) PCT Pub. No.: WO2020/047613
PCT Pub. Date: Mar. 12, 2020

(65) Prior Publication Data
US 2021/0354106 A1    Nov. 18, 2021

(30) Foreign Application Priority Data

Sep. 6, 2018 (AU) ............................ 2018903333

(51) Int. Cl.
*B01J 19/32* (2006.01)
*B01D 3/00* (2006.01)
*B01D 3/28* (2006.01)

(52) U.S. Cl.
CPC ............ *B01J 19/32* (2013.01); *B01D 3/009* (2013.01); *B01D 3/28* (2013.01); *B01J 19/325* (2013.01);
(Continued)

(58) Field of Classification Search
CPC .. B01J 19/32; B01J 19/325; B01J 2219/3221; B01J 2219/32213; B01J 2219/32244;
(Continued)

(56) References Cited

U.S. PATENT DOCUMENTS 4,224,257 A * 9/1980 Robinson ................ F28F 25/08
261/DIG. 11
5,363,909 A    11/1994 Acharya et al.
(Continued)

FOREIGN PATENT DOCUMENTS

| CA | 2225293 A1 | 6/1999 |
| CN | 100431687 C | 11/2008 |

(Continued)

OTHER PUBLICATIONS

Prasser et al., "A new electrode-mesh tomograph for gas-liquid flows", Flow Measurement and Instrumentation, vol. 9, 1998, pp. 111-119.
(Continued)

*Primary Examiner* — Lessanework Seifu
(74) *Attorney, Agent, or Firm* — Michael Best & Friedrich LLP

(57) ABSTRACT

The disclosure provides a structure that is used in the treatment of a fluid. The packing structure comprises a body having an axis. The packing structure also has at least one curved flow path that rotates around, and extends along at least a portion of, the axis of the body.

16 Claims, 22 Drawing Sheets

(52) U.S. Cl.
CPC .............. *B01J 2219/3221* (2013.01); *B01J 2219/32213* (2013.01); *B01J 2219/32234* (2013.01); *B01J 2219/32244* (2013.01); *B01J 2219/32262* (2013.01); *B01J 2219/32279* (2013.01); *B01J 2219/32286* (2013.01)

(58) Field of Classification Search
CPC .... B01J 2219/32251; B01J 2219/32255; B01J 2219/32262; B01J 2219/32268; B01J 2219/32272; B01J 2219/32289; B01J 2219/32279; B01J 2219/32296; B01J 2219/328

See application file for complete search history.

(56) References Cited

U.S. PATENT DOCUMENTS

| | | | |
|---|---|---|---|
| 6,227,699 | B1 | 5/2001 | Wight, Jr. |
| 6,585,237 | B2 * | 7/2003 | Pagade .................. B01J 19/24 261/84 |
| 2001/0038811 | A1 | 11/2001 | Paikert et al. |
| 2002/0063344 | A1 | 5/2002 | Pagade |
| 2003/0116871 | A1 | 6/2003 | Ringo et al. |
| 2005/0121811 | A1 | 6/2005 | Nomura et al. |
| 2006/0230613 | A1 | 10/2006 | Whittenberger et al. |
| 2007/0205523 | A1 | 9/2007 | Kojima |
| 2012/0267805 | A1 | 10/2012 | Haggerty |
| 2017/0189875 | A1 | 7/2017 | Von Deak |
| 2019/0076815 | A1 | 3/2019 | Lambert et al. |

FOREIGN PATENT DOCUMENTS

| | | |
|---|---|---|
| CN | 202725186 U | 2/2013 |
| EP | 0270050 A2 | 6/1988 |
| EP | 0930097 A2 | 7/1999 |
| WO | 9015256 A1 | 12/1990 |
| WO | 2019001775 A1 | 1/2019 |

OTHER PUBLICATIONS

Matusiak et al., "Measurement of Dynamic Liquid Distributions in a Fixed Bed Using Electrical Capacitance Tomography and Capacitance Wire-Mesh Sensor", Ind. Eng. Chem. Res., vol. 49, 2010, pp. 2070-2077.

Da Silva et al., "Capacitance wire-mesh sensor for fast measurement of phase fraction distributions", Meas. Sci. Technol., vol. 18, 2007, pp. 2245-2251.

Bieberle et al, "Measurement of Liquid Distributions in Particle Packings Using Wire-Mesh Sensor versus Transmission Tomographic Imaging", Ind. Eng. Chem. Res., vol. 49, 2010, pp. 9445-9453.

Sulzer Chemtech, "Structured Packings: Energy-efficient, innovative and profitable", Product Information, 2018, 20 pages.

International Search Report and Written Opinion for Application No. PCT/AU2019/050963 dated Oct. 24, 2019 (12 pages).

European Patent Office Extended Search Report for Application No. 19857419 dated Oct. 12, 2021 (11 pages).

* cited by examiner

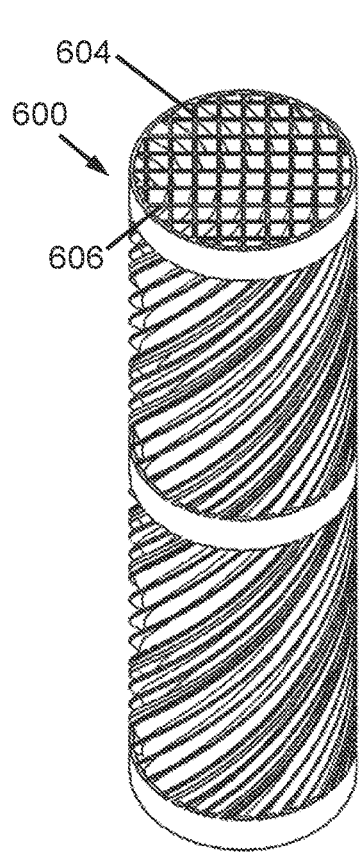
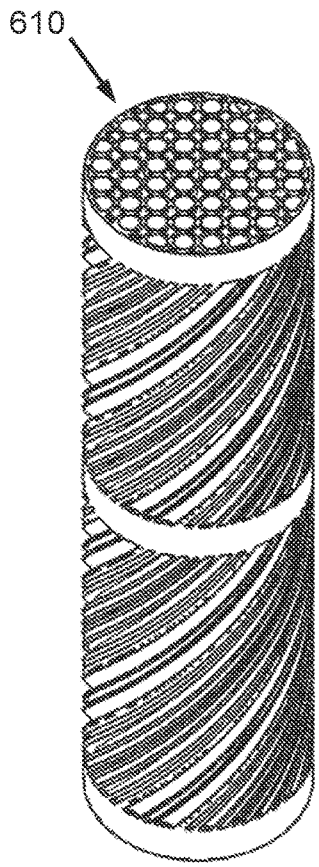
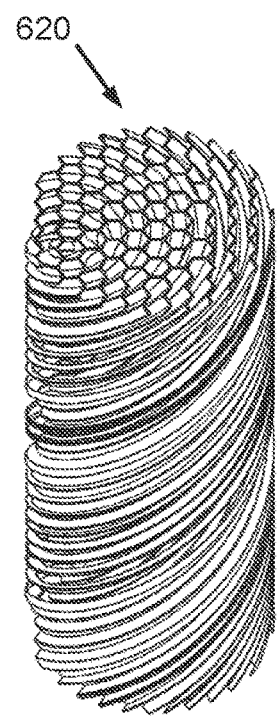
Figure 19a
Figure 20a
Figure 21a
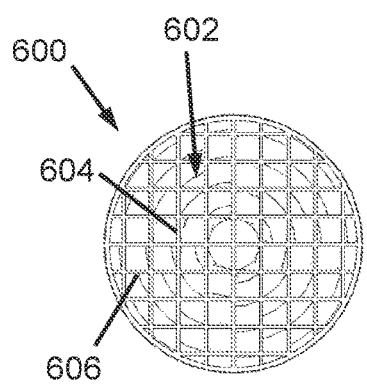
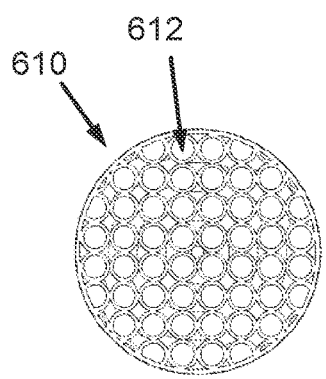
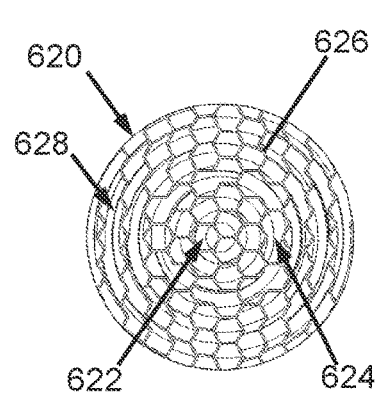
Figure 19b
Figure 20b
Figure 21b

STRUCTURED PACKING

TECHNICAL FIELD

This disclosure relates to structured packing that is used in packing beds for chemical and processing industries.

BACKGROUND

Structures used in the treatment of a fluid, such as structured packing (or packing structure), is a form of packing used in packed beds for chemical and processing industries. The purpose of packed beds is to increase gas/liquid interfaces and increase the mass transfer in absorption columns. Mass transfer of fluids passing through structured packing is related to the concentration gradient of the fluid(s), a surface area of the structured packing, and a mass transfer constant. The concentration gradient can be adjusted up to a point depending on the use of the structured packing, and the mass transfer constant remains relatively constant. One way to change the performance of structured packing is to change a surface area of the packing. However, there are performance requirements that determine the limits to which the surface area can be adjusted. For example, high surface areas are generally favourable for mass transfer, but structured packing with too high a surface area may be susceptible to fouling by fluid channels being blocked by liquid. Further, specific packing architectures are required to minimise issues such as pressure drop, but these architectures generally result in a compromise of mass transfer etc. Therefore, the overall performance of structured packing is generally a compromise.

Structured packing generally consists of a series of corrugated sheets where a fluid such as gas has to make abrupt changes in flow direction (e.g. 90°) as it passes through the packing and liquid has to follow a steep path (e.g. 30°-60° to the normal plane). This design has remained largely unchanged since its advent in the 1960's. However, current structured packing design is less than ideal as issues of pressure drop and less than ideal mass transfer persist.

It is to be understood that, if any prior art is referred to herein, such reference does not constitute an admission it forms a part of the common general knowledge in the art, in Australia or any other country.

SUMMARY

The disclosure provides a structure that is used in the treatment of a fluid, comprising: a body having an axis, the body having a plurality of sheets, wherein adjacent sheets of the plurality of sheets define a curved fluid flow path that rotates around the axis as the sheets extends from one end of the body towards another end of the body. At least one channel may extend along at least a portion of one or more of the sheets.

The disclosure also provides a structure that is used in the treatment of a fluid, comprising: a body having an axis, the body comprising a plurality of sheets, wherein each sheet forms a continuous surface that rotates around the axis as each sheet extends along at least a portion of the axis from a first end of the body towards a second end of the body, the plurality of sheets being arranged relative one another so that a continuous flow path is formed between adjacent sheets. At least one channel may extend along at least a portion of one or more of the plurality of sheets. A plane of each sheet may be angled transverse to the axis. The continuous flow path may be constant so that fluid flowing through the flow path and/or channel continually rotates in a same direction.

The disclosure also provides a structure that is used in the treatment of a fluid, comprising:
a body having an axis;
at least one curved fluid flow path that rotates around, and extends along at least a portion of, the axis of the body.

The structure may be a packing structure for use in a packed bed.

Providing a curved flow path that forms a fluid flow path that rotates around, and extends along at least a portion of, the axis of the body may help to reduce the occurrence of fluid having to change its flow direction for example by 90°. The curvature may be constant, for example so that fluid flowing through the channel either rotates around the axis in a clockwise or anti-clockwise direction. An advantage of this may be that the pressure drop across the body may be reduced as the fluid flows through the body.

The curved flow path may rotate around the axis with a constant radius. For example, the curve may be radially symmetrical about the axis. In this way, a uniform curved flow path may be formed where a fluid flowing through the fluid flow path may not experience any abrupt changes in direction such as a 90° change in direction. For example, the curve rotating around the axis can be approximately constant, such as that for a helix. The at least one flow path may minimise flow of fluid in a radial direction relative the axis. This may help to prevent fluid from migrating and pooling towards an edge of the body e.g. when the body is a cylinder and the fluid pools at a sidewall of the cylinder. Migration and pooling towards an edge of the body decreases a surface area of the fluid and this can lead to decreased mass transfer and heat exchange between fluids.

The fluid flow path may be continuous e.g. an uninterrupted flow path. The at least one flow path may rotate around the axis a plurality of times. The at least one flow path may rotate around the axis for only a portion of one turn, e.g. rotate <360°. A width of the at least one flow path may be greater than a depth of the flow path. Having a larger width than depth may help to increase a surface area of a fluid passing through the at least one flow path. A larger surface area may help to increase mass transfer and/or heat exchange between one or more fluids.

The at least one flow path may extend continuously along a length of the body. For example, the at least one flow path may extend from a first end to a second end of the body. Ends of the at least one flow path may be used as an inlet and/or outlet for fluid.

The body may comprise one or more sheets. The at least one flow path may be defined by or comprise at least one of the one or more sheets. In one embodiment, the at least one flow path is formed by or comprises a plurality of corrugations in the one or more sheets. Alternatively, or in addition to, the at least one flow path may be formed by walls that extend away from a surface of the one or more sheets. Each sheet may have a helicoid structure. The at least one flow path may have a helical flow path.

In some embodiments the body has a plurality of mutually isolated flow paths. The mutually isolated flow paths may be coaxially arranged and alternatively, or in addition to, be arranged linearly relative one another. In some embodiments the body has a first region having a first flow path and a second region having a second flow path. The second region may be coaxially arranged with the first region. The second region may be arranged linearly to the first region. A wall may at least partially delimit the mutually isolated flow path (e.g. the first region from the second region). The mutually isolated flow paths may have different orientations. For example, the first flow path may have a first orientation with respect to the axis and the second flow path may have a second orientation with respect to the axis. The first orientation may be different to the second orientation. For example, the first orientation may rotate around the axis in a clockwise direction and the second orientation may rotate around the axis in a counter clockwise direction, or vice versa.

In some embodiments the structure comprises a plurality of flow paths. In an embodiment, when viewed in cross-section perpendicular to the axis, two or more flow paths of the at least one flow path are positioned relative one another so that the two or more flow paths extend across the axis between opposed sides of the body. For example, when viewed in cross-section perpendicular to the axis, at least some of the plurality of flow paths may be positioned on a plurality of planes that are arranged parallel to one another. Alternatively, or in addition to, when viewed in cross-section perpendicular to the axis, in some embodiments two or more flow paths of the at least one flow path are positioned relative one another so that the two or more flow paths extend radially outwards from a common point. For example, when viewed in cross-section perpendicular to the axis, at least some of the plurality of flow paths may be positioned on a plurality of planes that extend radially outwards from a common point. There may be a plurality of common points. The common point may be positioned along the axis of the body. The common point may be radially offset to the axis of the body. The plane(s) may be imaginary or may be defined by the plurality of sheets.

In some embodiments the at least one flow path may be provided with one or more protrusions that increase a surface area of the flow path. The one or more protrusions may include a divot, bump, ridge, valley, wall, flanges and structure that extend away and/or along the flow path. The at least one flow path may be provided with one or more apertures. When a plurality of flow paths are used, the aperture may allow adjacent fluid flow paths to be in fluid communication.

The body may define an internal volume. The at least one flow path may be positioned in the internal volume. A perimeter of the body may be defined by a polygon which allows adjacent bodies to be tessellated with one another. When such a polygon is used, the structure may be a modular unit. Modular units may be stacked together to form an assembly e.g. for use in a packed bed.

A diameter of the structure may be 100 mm or less. The axis may be located at a centroid of the body. The structure may be a packing structure for use in a packed bed. The structure may form a modular structure unit. A plurality of the modular structure units may be combined with other modular structure units to form a structure assembly.

The disclosure also provides a structure assembly comprising a plurality of the modular structure units as set forth above. A diameter of the structure assembly may be at least two times a diameter of a modular unit of the plurality of modular structure units. A maximum diameter of the structure assembly may be 500 mm or less. The structure assembly may be combined with other structure assemblies to form a packed bed.

Embodiments of the structure may be used as a reactor and/or mass and/or heat transfer device.

The disclosure also provides a system for treating a fluid comprising: a hollow body having a fluid inlet and a fluid outlet, and a fluid flow path being defined there between; and the structure as set forth above positioned in the fluid flow path.

The disclosure also provides a packed bed comprising the structure as set forth above.

The disclosure also provides method of treating a fluid, comprising passing the fluid through the structure as set forth above.

The disclosure also provides a fluid treated using the method as set forth above.

BRIEF DESCRIPTION OF FIGURES

Embodiments will now be described by way of example only with reference to the accompanying non-limiting Figures, in which:

FIG. 19a shows another embodiment of a packing structure.

FIG. 19b shows an end view of the packing structure of FIG. 19a.

FIG. 20a shows another embodiment of a packing structure.

FIG. 20b shows an end view of the packing structure of FIG. 20a.

FIG. 21a shows another embodiment of a packing structure.

FIG. 21b shows an end view of the packing structure of FIG. 21a.

FIG. 22b shows an end view of the packing structure of FIG. 22a.

FIG. 23b shows an end view of the packing structure of FIG. 23a.

DETAILED DESCRIPTION OF EMBODIMENTS

Figure 1:
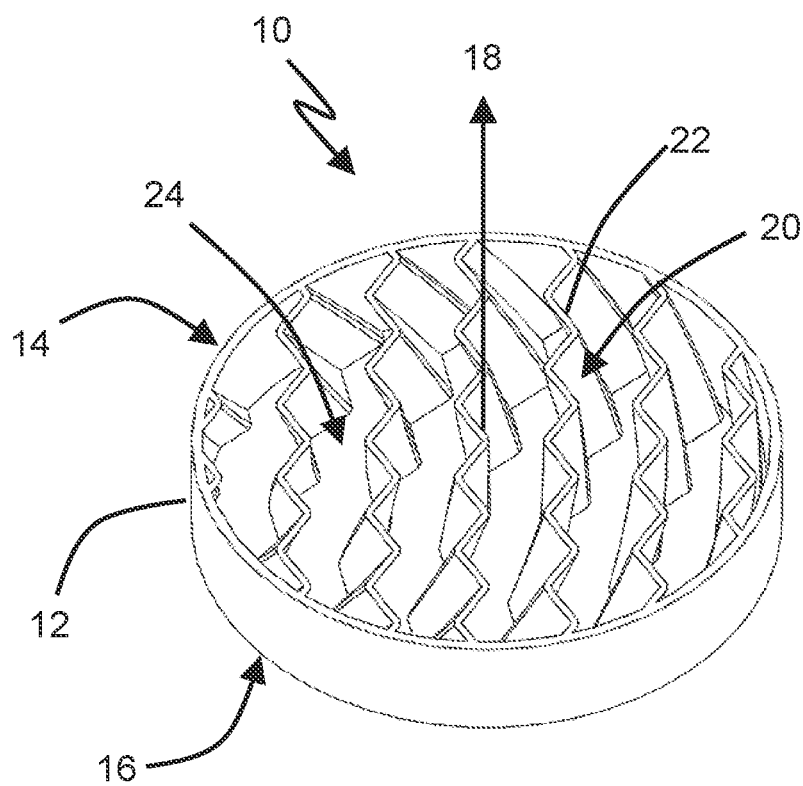
FIG. 1 shows an embodiment of a packing structure.

FIG. 1 and FIGS. 1a-1c show an embodiment of a packing structure 10. Packing structure 10 is for use in a packed bed that is used in the treatment of a fluid, such as gas or liquid. The packing structure 10 has an elongate body in the form of cylinder 12. Cylinder 12 has a first end 14 and a second end 16 and defines an internal volume. An axis 18 of the cylinder 12 extends between the first end 14 and second end 16. The length of the packing structure 10 shown in FIG. 1 is shown as being short so that the features of the packing structure 10 can be more easily understood. The length of the packing structure 10 is not limited to that shown in FIG. 1. A length of the packing structure 10 extending along the axis 18 can vary depending on the usage requirements. The packing structure 10 also has a plurality of flow paths in the form of channels (or grooves) 20. The channel can also be referred to as a groove.

Figure 1A:
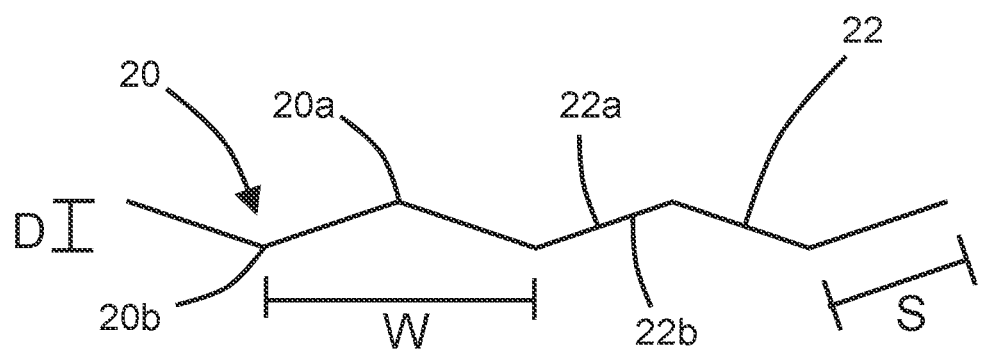
FIG. 1a shows a close-up end view of a flow path from FIG. 1.

Channels 20 are provided by corrugations formed in a plurality of sheets 22. However, in other embodiments each channel is provided as a structure that is separate to the sheets 22. The plurality of sheets 22 are arranged approximately parallel to one another. Channel 20 has a width W and a depth D as best seen in FIG. 1a. Channel 20 also has a segment length S. Adjacent segments meet at apex 20a. Segment length is related to the width W and depth D of channel 20. Generally, the width W is greater than the depth D so that a surface area of a fluid present in channel 20 has a maximum surface area. In this way, any fluid in channel 20 can be present as a thin film. Thin films are advantageous as they help to maximise mass transfer between different fluids and heat exchange processes.

Figures 1B, 1C:
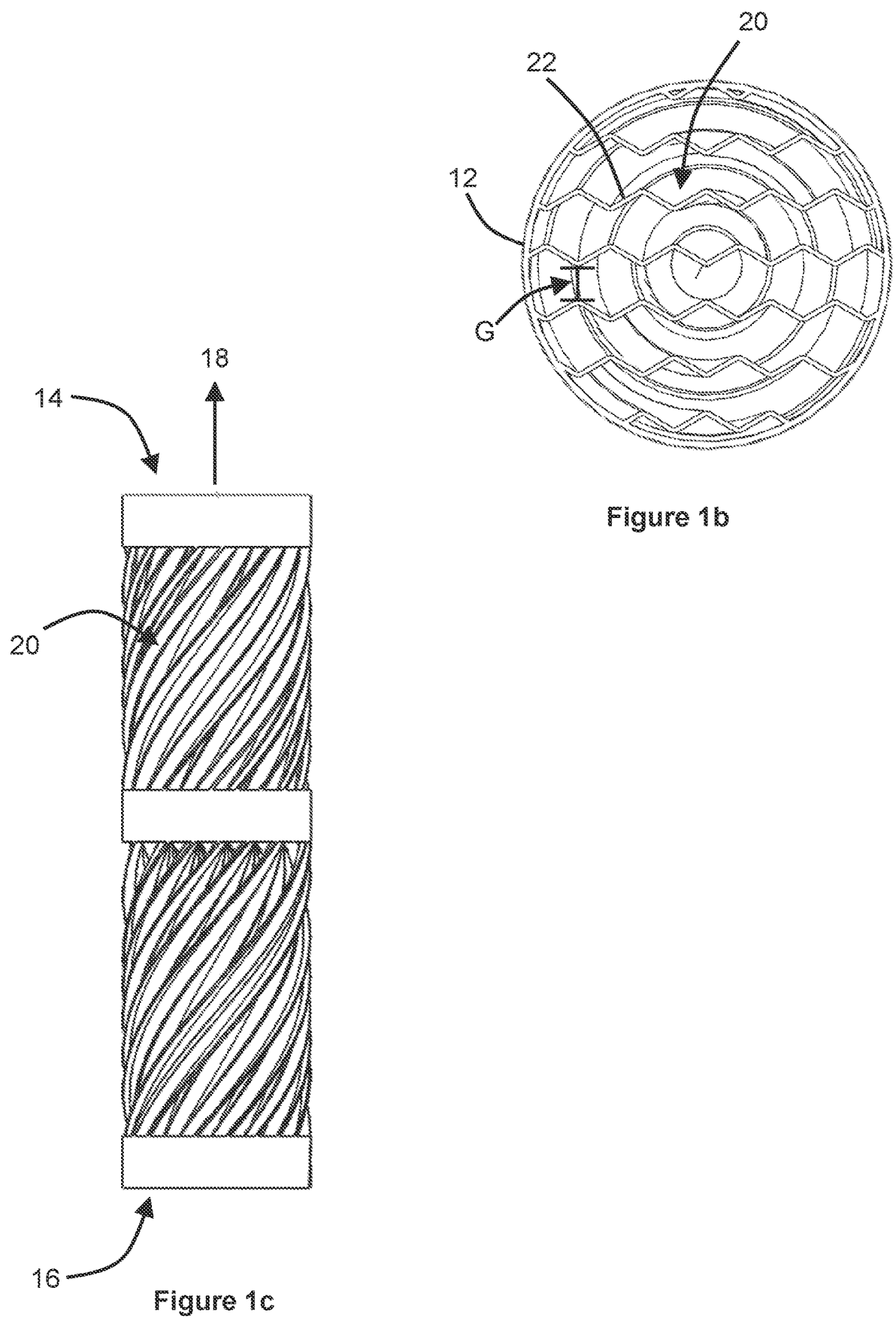
FIG. 1b shows an end view of the packing structure of FIG. 1.
FIG. 1c is shows in side view an internal structure of the packing structure of FIG. 1.

Each sheet has a first side 22a and a second side 22b. A first set of apexes 20a is formed on the first side 22a and a second set of apexes 20b is formed on the second side 22b. A gap G is formed between adjacent sheets (FIG. 1b). In FIG. 1 the sheets 22 are arranged relative one another so that the first set of apexes 20a face and are aligned with the second set of apexes 20b of an adjacent sheet 22. This arrangement gives an appearance of a hexagon without parallel side walls, where adjacent sheets are offset by half of the width W. However, in some embodiments the sheets 22 are arranged so that the first set of apexes 20a are all aligned along a first set of imaginary lines and the second set of apexes 20b are all aligned along a second set of imaginary lines that are parallel to the first set of imaginary lines.

The outer wall of the cylinder 12 in FIG. 1c has been omitted for clarity. The outer wall of the cylinder 12 is not required in all embodiments.

The channel 20 extends from the first end 14 to second end 16, and at the same time, rotates around the axis 18 to create a uniform circular fluid flow path. Therefore, the channel 20 forms a continuous curved surface so that a continuous curved (curvilinear) flow path is formed. The sheets 22 that form the channels 20 (via corrugations) in FIG. 1 are formed as a curved surface, such as a helicoid surface that extends along a length of the cylinder 12 i.e. from the first 14 end to second end 16. Therefore, each channel extends from the first end 14 to second 16 end in a helical path. Providing a helical flow path may help to minimise any abrupt changes in fluid flow. For example, the fluid flows through the packing structure 10 in a constant rotational direction about the axis 18, such as clockwise or counter-clockwise but does not change between the two. Minimising abrupt changes in fluid flow can help to reduce the occurrence of pressure drop. Put another way, a tortuous fluid flow path through cylinder 12, as generally used in prior art packing structures, is minimised.

Because each channel has a separate and isolated fluid flow path from adjacent channels, any fluid flow (e.g. liquid) in the channel tends to follow the same path as the channel. An advantage of this is that liquids tend to not move radially relative the axis. For example, fluid build-up at a sidewall of cylinder 12 or migration of fluid radially inwards towards the axis 18 can be minimised or eliminated. The channels 20 also help to maintain a high surface area since fluid tends not to pool or build up at specific locations of the cylinder 12. The channels 20 also help to keep a surface area of the fluid in the channels 20 approximately constant as the fluid passes through the cylinder 12. However, the skilled person would appreciate that changes to the liquid due to mass transfer (e.g. evaporation) during the passage of a fluid through the cylinder 12 can change the surface area of the fluid.

The channel 20 need not extend along an entirety of the cylinder in all embodiments. In some embodiments the channel 20 only extends along a portion of the cylinder. For example, when the channel 20 is formed by a structure in the sheet 22, a portion of the sheet 22 is substantially planar and free from e.g. corrugations when viewed in a cross-section that is perpendicular to the axis.

In the embodiment of FIG. 1a plurality of sheets 22 are used. A conduit 24 is formed between adjacent sheets 22. Because the sheets 22 have a helicoid structure, the conduit 24 also adopts a helical path. The specific helical path of the conduit 24 is dependent upon the specific helicoid structure of the sheets 22. Because a helicoid structure is used for the sheets, a flat sheet cannot simply be exchanged with sheet 22. Put another way, the helicoid structure of sheet 22 is not formed from a flat or general planar structure. For example, sheet 22 can be formed by permanently twisting a flat plate when the flat plate is in a form that is malleable e.g. after heating to form a sheet having a helicoid structure. Some embodiments use additive manufacturing to prepare sheets 22. The spacing between adjacent sheets is determined by the intended use of the packing structure 10.

In the embodiment of FIG. 1, the sheets 22 extend continuously from the first end 14 to second end 16. This means that the conduit 24 is also continuous from the first end 14 to the second end 16. Because of this, channel 20 can be considered a primary channel and conduit 24 can be considered an auxiliary channel, or vice versa. The channel 20 may act as a liquid channel and conduit 24 may act as a gas channel. In some embodiments, channel 20 need not extend continuously from the first end 14 to the second end 16.

The surface area of the packing structure is the characteristic that facilitates the interfacial area required for mass transfer. For the embodiments of the packing structures of this disclosure, the surface area can be compared by analysing the surface area per unit volume: the surface area (m²) of each plate divided by the volume (m³) of the column defined by the column diameter and length. The surface area (per unit volume) is a function of:

R: the number of revolutions of the sheet about the length of the column
D: the column diameter (m)
L: the column length (m)
the segment length (m) of the channel (20)

An additional parameter, tan(a) provides a concise relationship between R, D and L and is given by:

$$\tan(\alpha) = \frac{L}{R \cdot D} \times 0.5$$

where α is the angle formed at the circumference of the structure between an imaginary plane that is perpendicular to the axis (e.g. 18) and a planar surface of the plate (22) (i.e. direction of channel 20). For example, as a decreases (i.e. as the plates 22 become more perpendicular to the axis 18), the number of revolutions of each plate 22 per unit length increases.

As the structures of embodiments of the disclosure have different segment lengths (S), different gaps (G) between adjacent sheets, and different number of rotations per unit length, the following naming nomenclature is used to differentiate between different structures of the disclosure:

Xmm-YR-ZG, where X is the segment length (S) in mm, Y is the number of rotations per unit length, and Z is the gap (G) relative the segment length. For example, 5 mm-1R-1G is a structure having a segment length (S) of 5 mm, 1 rotation per unit length, and a gap (G) of 5 mm (i.e., G=S).

Figure 15:
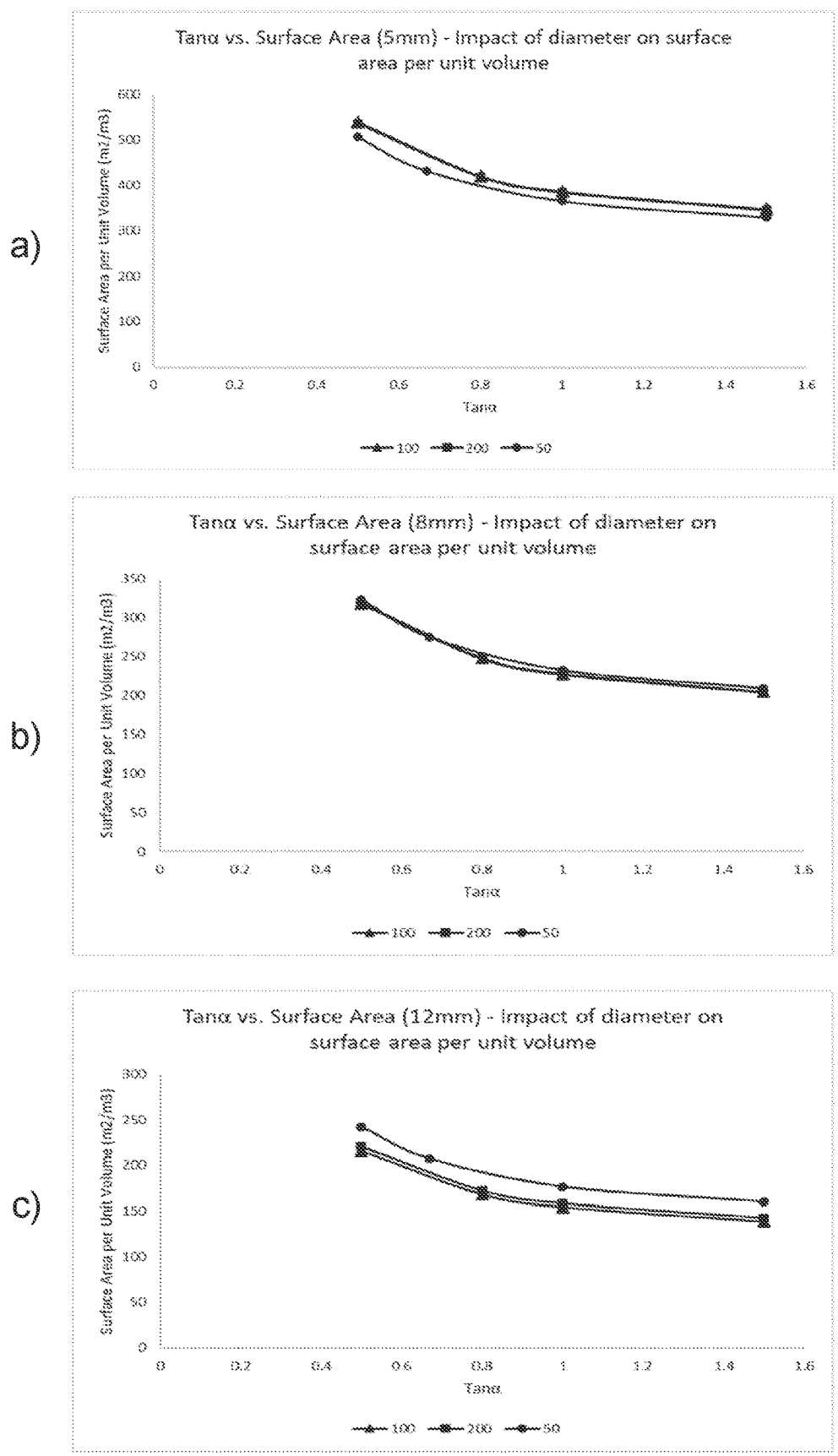
FIG. 15a shows the effect of a on the resulting surface area per unit volume for different diameters (expressed in mm) of an embodiment of a structure having a segment length of 5 mm.
FIG. 15b shows the effect of a on the resulting surface area per unit volume for different diameters (expressed in mm) of an embodiment of a structure with a segment length of 8 mm.
FIG. 15c shows the effect of a on the resulting surface area per unit volume for different diameter (expressed in mm) of an embodiment of a structure with a segment length of 12 mm.

Data was collected from numerous CAD models whereby the column length, L, remained constant. FIGS. 15(a-c) show the effect of a on the resulting surface are per unit volume for different diameters (mm) at varying segment lengths. As seen in FIGS. 15(a-c), for a given column diameter and segment length, as a increases (which represents an increasingly straight path along the column length), the surface area per unit volume of the packing approaches a constant value. The curves relating surface area per unit volume and a approximately coincide for different segment lengths. This implies that for a given segment length, the influence of the column diameter on the surface area per unit volume is generally negligible. Consequently, when scaling the packing "out" to larger diameters, the surface area per unit volume achievable will be the same as that of smaller diameters.

Figure 16:
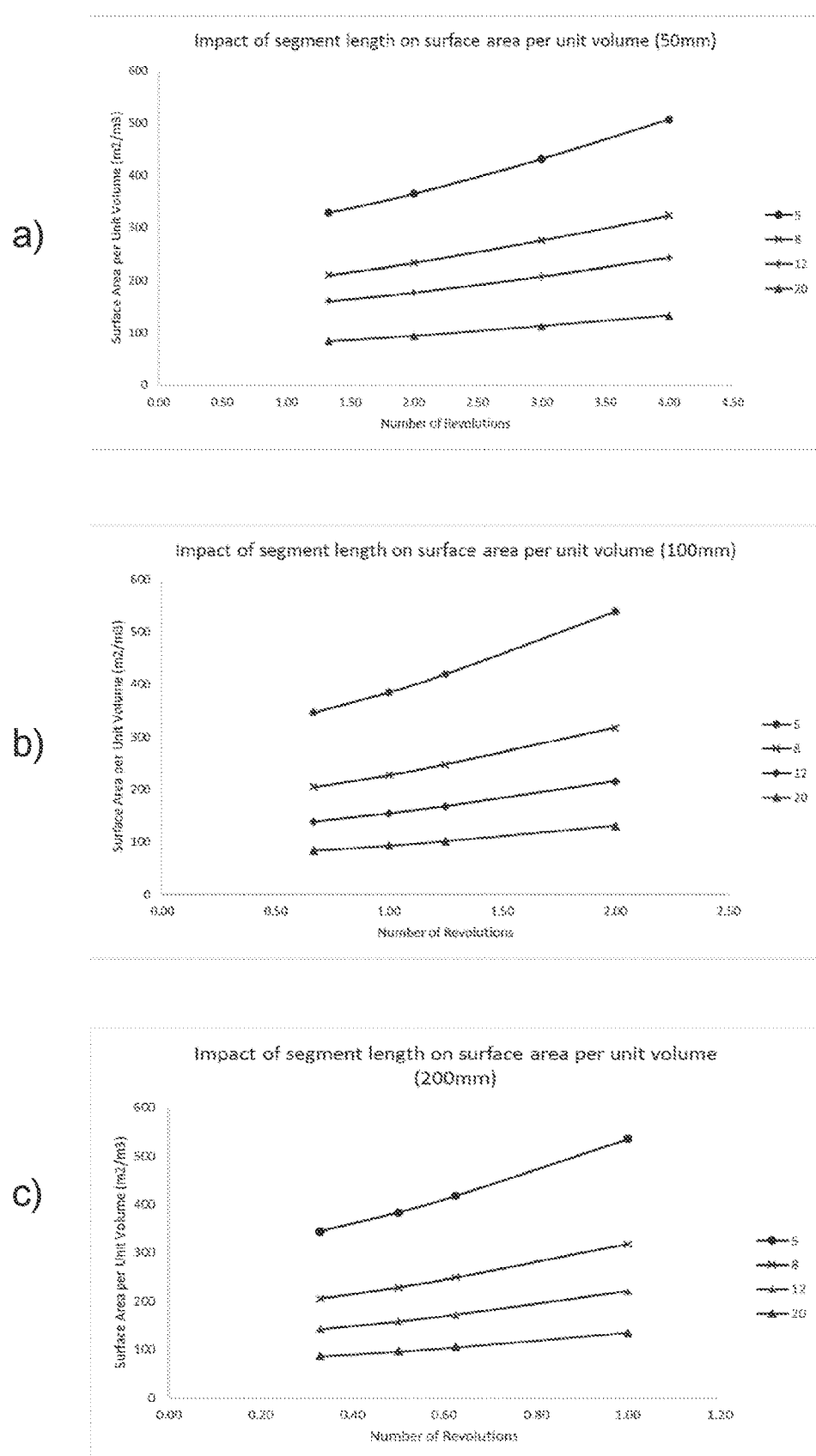
FIG. 16a shows the relationship between the number of rotations and the surface area per unit volume for an embodiment of a structure having a diameter of 50 mm with varying segment lengths (expressed in mm).
FIG. 16b shows the relationship between the number of rotations and the surface area per unit volume for an embodiment of a structure having a diameter of 100 mm with varying segment lengths (expressed in mm).
FIG. 16c shows the relationship between the number of rotations and the surface area per unit volume for an embodiment of a structure having a diameter of 200 mm with varying segment lengths (expressed in mm).

FIGS. 16(a-c) shows the relationship between a and the surface area per unit volume for varying segment lengths (S) at different diameters (diameter in mm). The surface area of a column (for a fixed column length) can be increased in two primary ways: (i) increasing the number of revolutions; or (ii) decreasing the segment length (S). The surface area (per unit volume) increases with the number of revolutions according to the parabolic equations defined in FIGS. 16(a-c).

Figure 17:
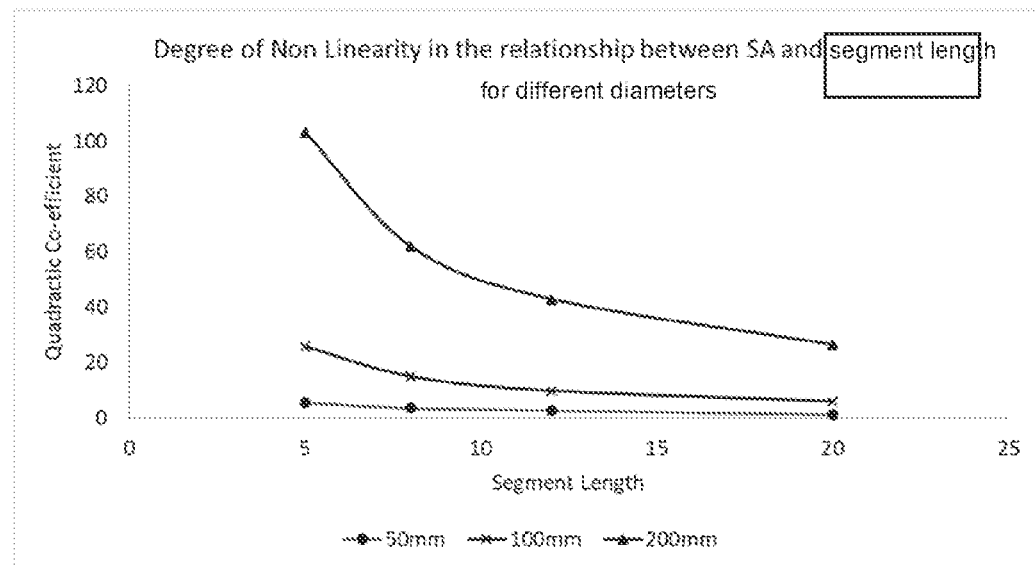
FIG. 17 shows the non-linearity constant derived from the surface area per unit volume for a change in segment length (mm) for structures having different diameters (mm).

FIG. 17 shows the non-linearity constant derived from the surface area per unit volume for all data points. FIG. 16 highlights the impact of segment length (S; in mm) on the non-linear component of the relationship between the surface area and number of revolutions. As such, the surface area grows exponentially with decreasing segment length(s) and becomes increasingly prominent for larger column diameters. It should also be noted that as the segment length is decreased, the benefit of having a denser packing in terms of surface area per unit volume is limited. In other words, any decrease in segment length S beyond typical length of 10 mm would not provide a significant improvement in surface area per unit volume. This phenomenon occurs as the design bears an increasing resemblance to flat, un-corrugated sheets.

Figure 18:
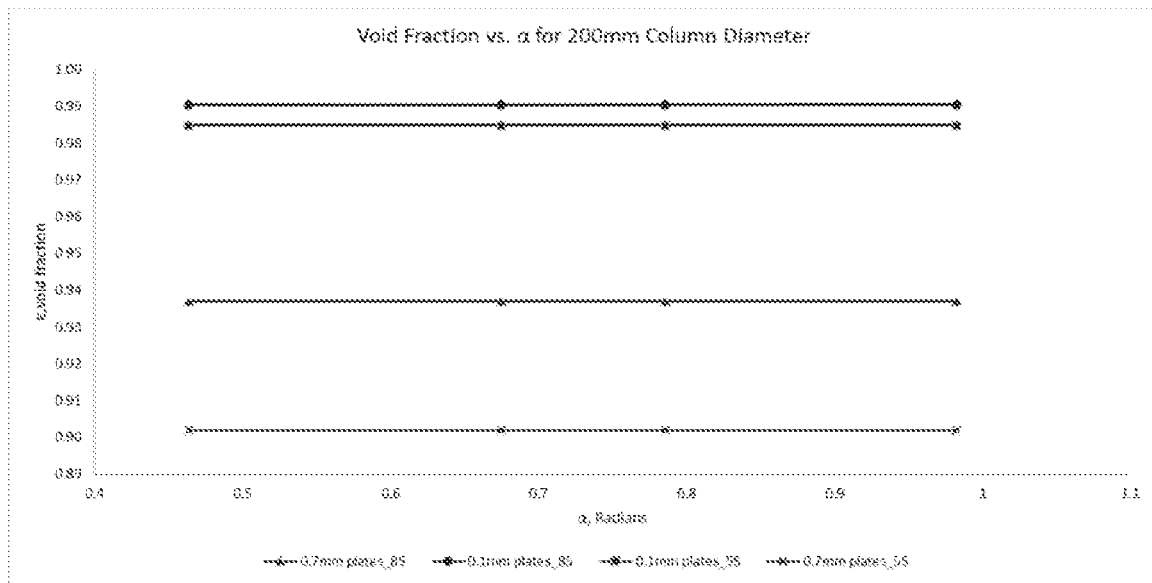
FIG. 18 shows the voidage values obtained at varying plate thickness.

FIG. 18 shows the voidage values obtained with varying sheet thickness. Typical sheet thickness of commercial packing is 0.1-0.5 mm. The experimental and CFD data were obtained for a thickness of 0.7 mm due to the limitation in manufacturability of prototypes. However, this limitation is not expected in packing manufactured by techniques other than additive manufacturing. Thus, it is important to understand the effect of thickness of the plate on the voidage. It can be seen from FIG. 18, that voidage is directly proportional to the bed thickness and is typically above about 0.90 but can be as high as 0.99.

The gap G between adjacent sheets 22 can be varied. Decreasing the gap G increases a surface area of the packing structure 10, while increasing the gap G decreases the surface area of the packing structure 10. In some embodiments the gap G is referenced to the pathlength S. For example, G=S, G<S, G>S, G=0.5 S. In some embodiments, adjacent sheets are connected by connecting walls. When connecting walls are used the gap G is equal zero as the adjacent apexes are joined and no air gap is provided therebetween.

In use, packing structure 10 is generally orientated vertically, that is the axis 18 extends vertically, and a liquid is applied from a top so that it flows along the plurality of channels 20 to exit at a base, such as the second end 16, and at the same time a gas is injected from a bottom of the packing structure 10 and passed upwards to exit at a top of the packing structure 10, e.g. first end 14, so the two fluids have a counter-flow arrangement. However, in other embodiments, two or more fluids can flow through the packing structure 10 in the same direction, and in other embodiments only one fluid is passed through packing structure 10 e.g. during distillation.

In some embodiments the channel s provided with walls extending from a surface of a sheet (not shown). In this way, the walls that delimit the sides of the channels. In some embodiments, walls extend from peaks of the corrugations that form channels 20. Such an arrangement can help to increase a surface area of a fluid (e.g. liquid) flowing along the channel 20.

In some embodiments the channel 20 and/or the sheet 22 is provided with protrusions that increase a surface area of the channel 20 and/or sheet 22. The protrusions can be in the form of an outward and/or inward extending dimple with respect to a plane of the channel 20 or sheet 22. In some embodiments the channel 20 has walls extending away from its surface. The walls can be orientation parallel, transverse, or a combination of both, relative to a fluid flow direction. The walls can promote turbulent fluid flow at a localised level to facilitate mixing and mass transfer between fluids, but otherwise do not alter a global fluid flow through the packing structure. Walls also aid in laterally spreading a fluid film present on the channel 20 or sheet 22. Spreading a film can help to reduce agglomeration or pooling of fluid. The walls can be planar or curved. Examples of such arrangements are shown in FIGS. 6a-e. The fluid flow direction is depicted as arrow 30 in FIGS. 6a-e and is generally in the direction of the channel 22.

Figure 6:
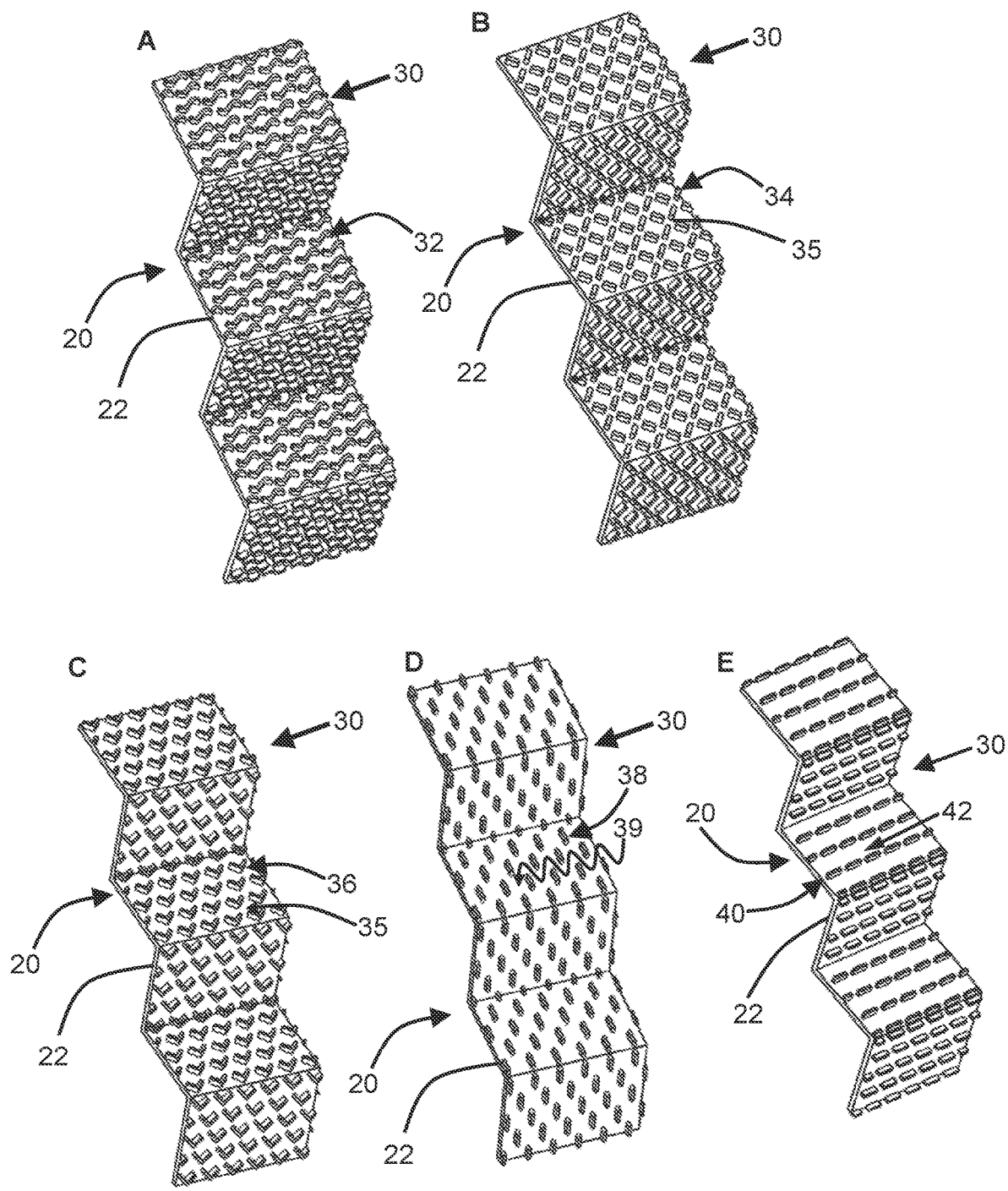
FIG. 6a-e shows various embodiments of a flow path.

In FIG. 6a, the walls have the form of an oscillating curve 32, such as a sine wave, that extends generally in a direction along the fluid flow 30. In FIG. 6b, the walls are short planar segments 34 that are separate from one another and arranged in a cross pattern where ends of adjacent segments 34 are spaced apart to form a gap 35 therebetween. Each segment 34 is arranged approximately 45° relative the flow path 30. The walls in FIG. 6c are formed by V-segments 36. An imaginary line extending between the two ends of the V-segment 36 is arranged generally parallel to the flow direction 30. An auxiliary flow path 37 is formed between adjacent V-segments 36. In FIG. 6d the walls are formed by elongate planar segments 38 that are spaced apart from one another. The segments 38 are arranged transverse (e.g. approximately perpendicular) to the flow direction 30 and so that a tortuous flow path 39 is formed between ends of adjacent segments 38. FIG. 6e uses similar elongate planar segments elements to the embodiment of FIG. 6d, but the segments 40 in FIG. 6e are arranged approximately parallel to the flow direction 30, which forms localised flow channel 40. In some embodiments, the channel 20 is formed from a plurality of e.g. corrugated channels. In this way, the channels 20 can be made from a fractal structure.

The flange arrangements depicted in FIGS. 6a-e help to maximise a surface area of a liquid flowing in channel 20 and can also help to prevent liquid from migrating radially relative the axis 18. However, the flange arrangements of FIGS. 6a-e are exemplary only and other arrangements can be used to maximise the surface area of a fluid flowing through channel 20. Protrusions and the like, such as surface dimples, can be used to control a surface architecture of the channel 20. Different architectures can be used to adjust a hydrophobicity of the surface. Therefore, depending on the intended use of the packing structure 10, specific surface architectures are used in some embodiments to maximise flow and mixing characteristics of different fluids i.e. the architectures enhance the intrinsic interaction with the fluids. However, the walls are not required in all embodiments.

Figure 28:
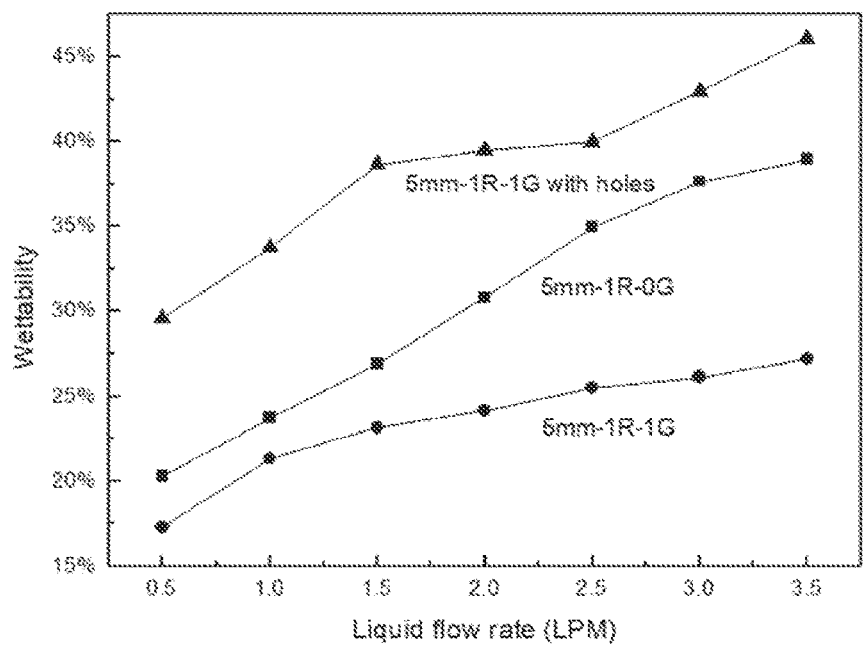
FIG. 28 shows the wettability of different embodiments of packing structures of the disclosure.

In some embodiments the channels 20 and/or sheets 22 are provided with apertures. The apertures help adjacent conduits to be in fluid communication with each other. Additionally, apertures can also allow fluid that would otherwise only flow along an in use upper surface of a channel 20 to pass through the aperture and also flow along a lower surface of the channel. Put another way, apertures can help fluid to flow along either side of sheets 22 (e.g. sides 22a and 22b) rather than just on an in use upper surface. As best shown in FIG. 28, when apertures are provided on the sheets 22, the wettability of the packing structure increases for a packing structure having a segment size S of 5 mm, 1 revolution per unit length and apertures having a diameter of 4 mm. The inclusion of apertures helps to increase an available wettable surface area instead of having to add additional features, such as connecting walls, to increase the surface area of the packing structure. It should be appreciated that the apertures are not required in all embodiments.

The corrugation formations of the sheets 22 of FIG. 1 resemble a honeycomb structure where adjoining walls are removed. Even without the adjoining walls, fluid (i.e. liquid) flowing along channels 22 remains mostly in the channel 22. An advantage of removing the adjoining walls of a honeycomb structure is that less material is needed to form the packing structure 10, and this results in a reduction of weight and manufacturing costs of the structure. However, elimination of the adjoining walls does not greatly affect the performance of the packing structure 10 in comparison to a structure having the adjoining walls. Eliminating the need for the adjoining walls also means that in embodiments where the channels and/or sheets are coated with a surface modifier (e.g. hydrophobic/hydrophilic substrates, catalysts, etc.), less modifier is required since there is less surface area. Because the weight and manufacturing costs of the packing 10 needs to be considered, a surface area of the channels, sheets etc. cannot be increased indefinitely.

Because the sheets 22 have a helicoid structure, a region closer to the axis 18 is angled more acutely relative the longitudinal axis compared to a region closer to a sidewall. In use this means that a liquid flowing through cylinder 12 will travel faster downwards near the centre compared to near a wall of the cylinder 12, so the residence time of a fluid passing through the cylinder will not be uniform across a diameter of the cylinder 12. However, a resistance of the packing structure 10 near the axis 18 can be increased to slow fluid flow near the axis 18 so that a more uniform residence time is formed across the diameter of the cylinder 12. For example, protrusions and walls, such as those shown in FIGS. 6a-e can be used to slow a speed at which a fluid passes down cylinder 12 near its axis 18.

Figure 2:
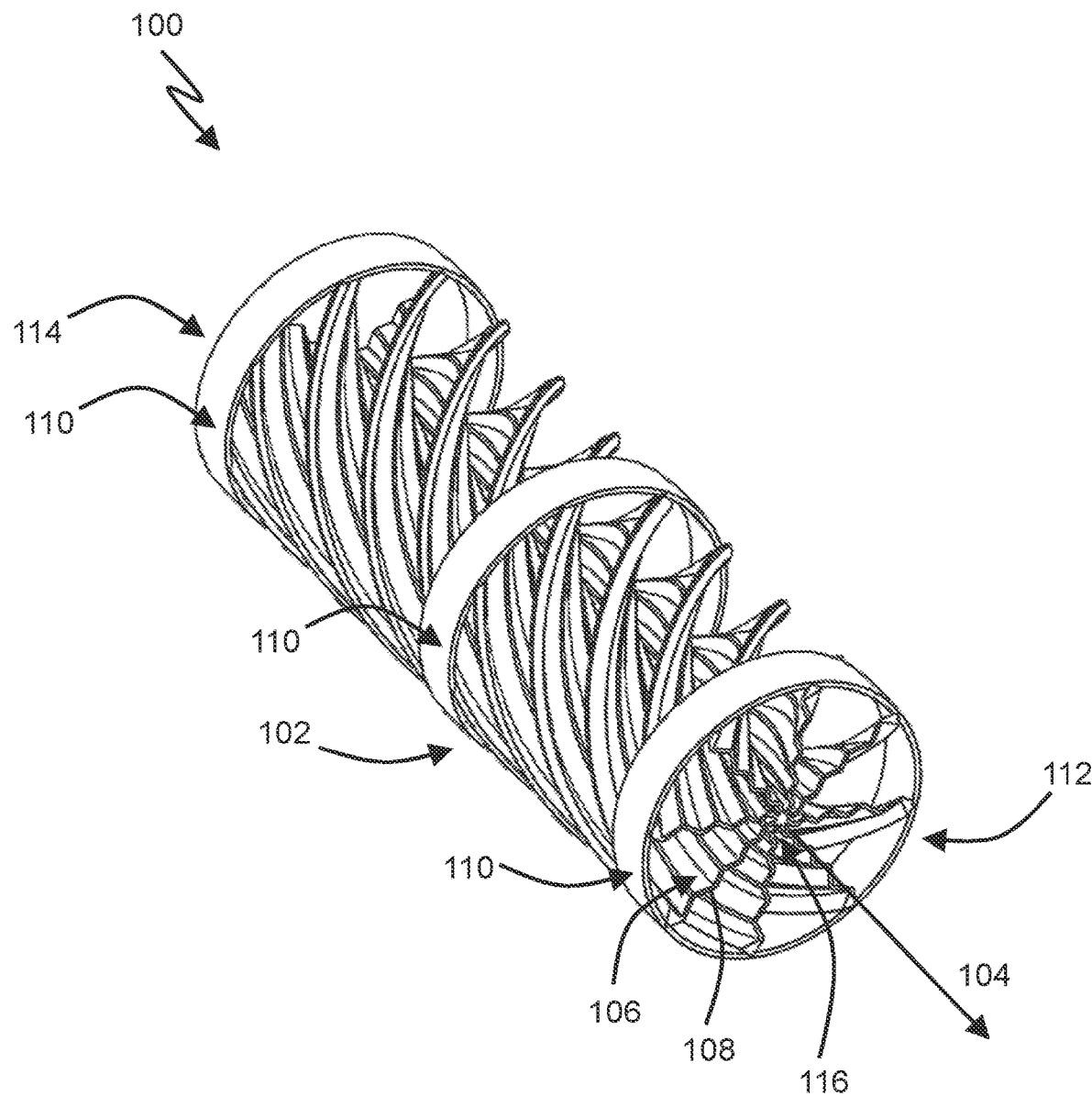
FIG. 2 shows another embodiment of a packing structure.

FIG. 2 shows another embodiment of a packing structure 100. Packing structure 100 has a generally elongate body 102 having an axis 104 extending between a first end 112 and second end 114. Rings 110 are used to provide support for sheets 108 but otherwise the body 102 is open i.e. does not define an internal volume per se. The rings 110 are not required in all embodiments. Alternatively, other structures may be provided, such as braces, to support sheets 108. In some embodiments, the packing structure 100 is provided as a hollow tubular body, where the sheets are housed in the tubular body. Similar to the embodiment of FIG. 1, the packing structure 100 has a plurality of channels in the form of channels 106. Channels 106 are provided by corrugations formed in a plurality of sheets 108. The channels 106 extend from the first end 112 to second end 114, and, at the same time, rotate around the axis 104 to create a uniform circular fluid flow path. The sheets 108 have a helicoid structure and the channels 106 define a helical flow path. Unlike the embodiment of FIG. 1, the sheets 108 in the embodiment of FIG. 2 extend radially outwards from a common point 116, which in this embodiment is located at the axis 104 of the body 102. However, the common point 116 need not be at the axis 104 in all embodiments and can be positioned off-axis relative axis 104.

Figure 7:
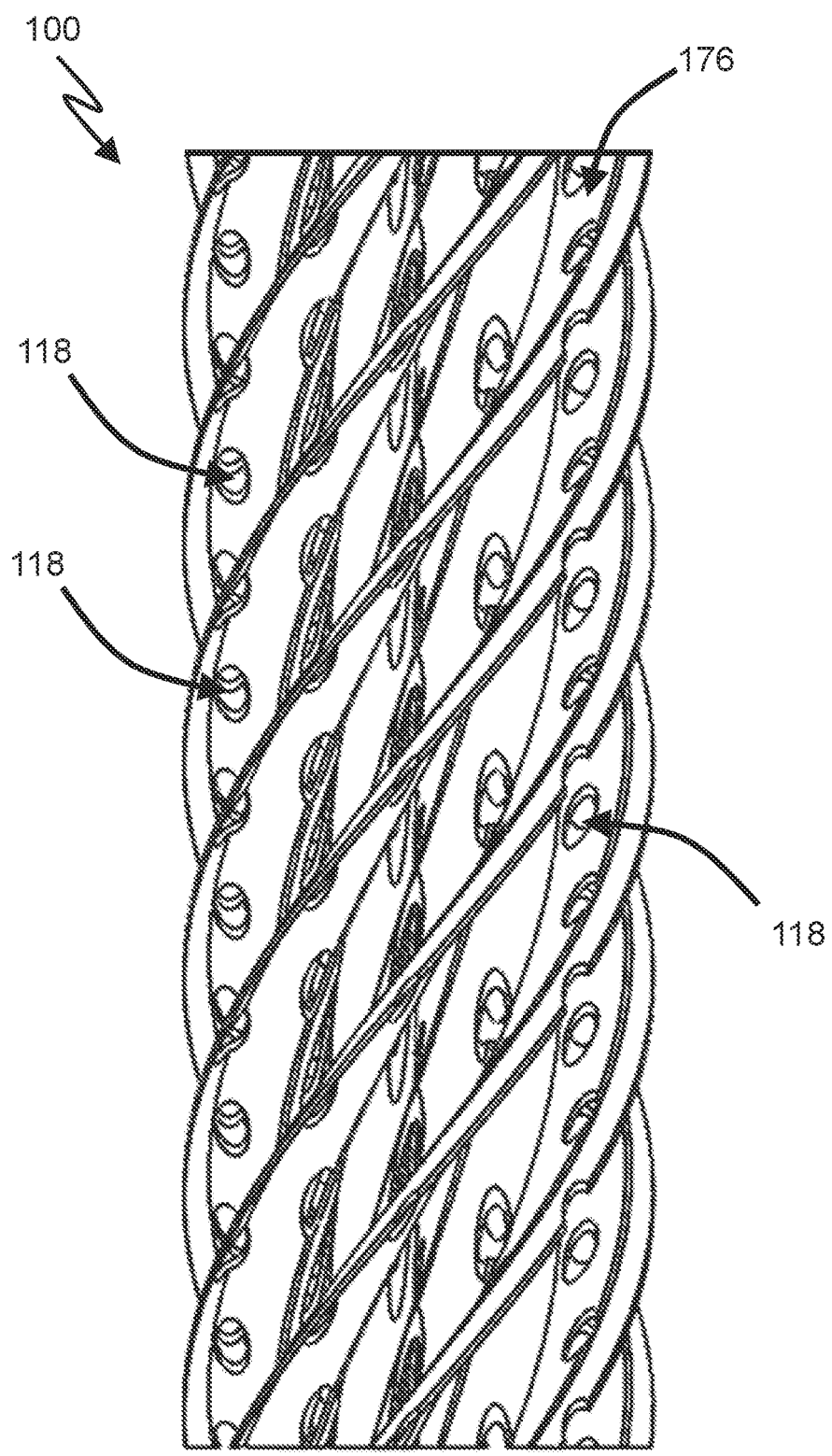
FIG. 7 shows another embodiment of a packing structure.

FIG. 7 shows a further embodiment of the packing structure 100, where each channel 106 has a number of apertures 118.

Figure 3:
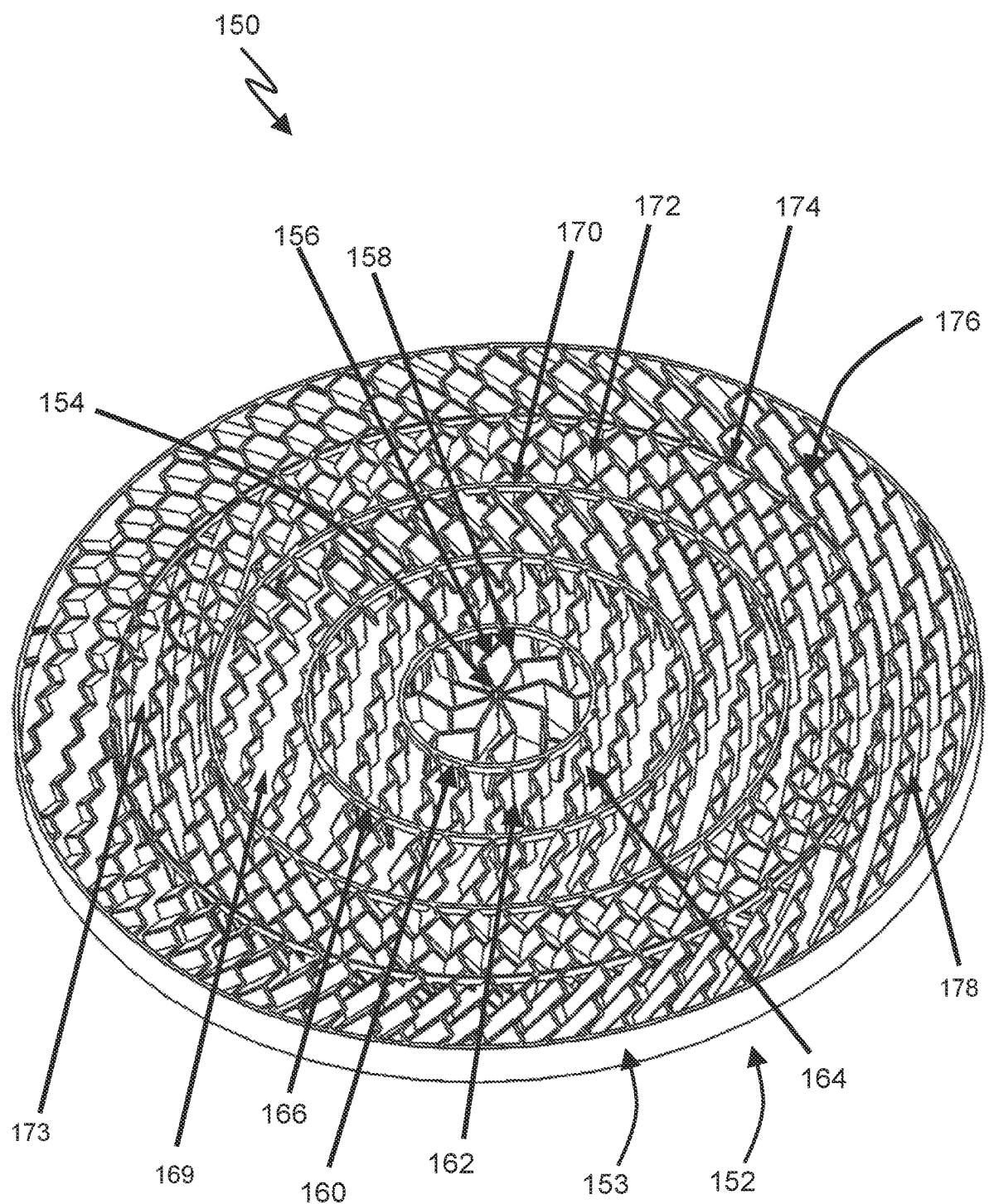
FIG. 3 shows another embodiment of a packing structure.

The packing structures with different architectures can be combined. For example, the architectures of the packing structures in the embodiments of FIGS. 1 and 2 can be combined, as best shown in FIG. 3. In packing structure 150, a first central region 158 has a plurality of channels 156 that are orientated in a first orientation relative an axis of the packing structure 150. In the embodiment of FIG. 3, the channels 156 rotate into the page in a clockwise direction. The axis is defined by the common point 154 that extends along an elongate direction of the body. The embodiment of FIG. 3 is shown as a thin cross-section for clarity only.

A second region 162, third region 168, fourth region 172 and fifth region 176 are coaxially arranged with each other and the central region 158. Second 162, third 168, fourth 172 and fifth 176 regions are formed from plates similar to that described in FIG. 1. The channels 164 of the second region 162 are orientated in a second orientation relative to the axis 154. The second orientation differs to that of the first orientation for the first region 160. In the embodiment of FIG. 3, the channels 164 in the second region 162 rotate into the page in a counter-clockwise direction. The third region 168 and fifth region 176 have channels 169 and 178, respectively, that rotate into the page in a clockwise direction. The fourth region 172 has channels 173 that rotate into the page in a counter-clockwise direction. Therefore, the orientation of the channels of adjacent regions alternates moving radially outwards from the central region 158 to the fifth region 176. However, in some embodiments the orientation of the channels of each region is the same or can be random.

Although the various regions can have the same or different orientation, the specific properties of the channels of each region may differ. For example, without modification when the plates are helical (or helicoidal), fluid will tend to flow faster through a more central region relative a radially outer region due to the fact that the channels on the more central region will be arranged more parallel to the axis relative the channels of a radially outer region. This results in a fluid residence time that is not uniform across the diameter of the cylinder structure e.g. 150. When the fluid is a liquid flowing down the structured packing the issue of non-uniform residence time tends to become most noticeable. In some embodiments, the channels 156 of the central region 152 are modified, for example by including protrusions, walls and/or adjusting angle α, to have a resistance similar to a resistance of e.g. channels 178 of the fifth region 176. This can help to provide a more uniform residence time across a diameter of the packing structure 150.

A wall delineates adjacent regions from one another. Wall 160 delineates the first 156 and second 162 region, wall 166 delineates the second 162 and third 168 region, wall 170 delineates the third 168 and fourth 172 region, and wall 174 delineates the fourth region 172 from the fifth region 176. Outer wall 153 encloses the body to form a cylinder. In some embodiments, the various walls delineating the various regions extend along an entire length of the body 152 so that each region is isolated from one another. However, in some embodiments, the various walls extend only along a portion of the body 152. In some embodiments, the various walls have apertures so that adjacent regions are in fluid communication with each other. In some embodiments, the walls are not present and the plates from each region are directly connected to one another.

Figure 4:
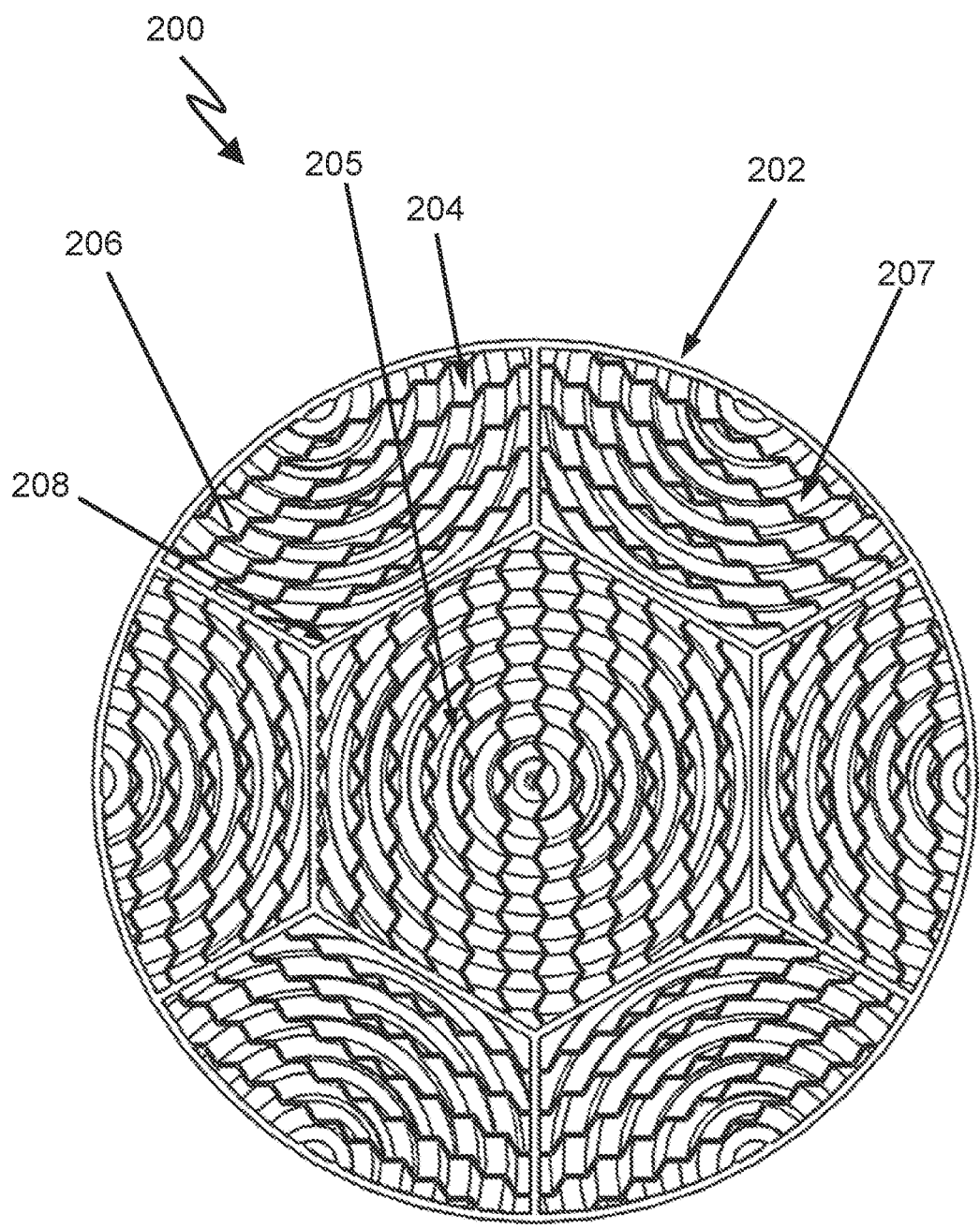
FIG. 4 shows an embodiment of a packing structure having modular packing structure units.

The embodiments of FIGS. 1 to 3 have the body being in the form of a cylinder. However, in some embodiments, a perimeter of the body is defined by a polygon which allows adjacent bodies to be tessellated with one another to form a packing structure assembly. In FIG. 4, the packing structure assembly 200 is formed from a number of tessellated modular structured packing units 204. The packing structure assembly 200 has a cylindrical outer wall 202. Each modular unit 204 has channels 206 similar to the embodiment shown in FIG. 1. Each modular unit 204 has a hexagon wall 208. Although a hexagon is depicted in FIG. 4, other polygons could be used, for example square, pentagon, or a combination of tessellated polygons such as an octagon and square. Providing modular units means that the diameter of the packing structure can be "scaled out" by the addition of more modular units around the perimeter. In contrast, a diameter of the packing structure 10 of FIG. 1 is increased by "scaling up".

A problem with "scaling up" for packing structures having helical (helicoidal) plates is that an angle of the plate relative a longitudinal axis (i.e. angle α) changes in a radial direction, which means in use there may not be a uniform residence time across a diameter of the packing structure. Providing modular units to "scale out" means that the diameter of each modular unit can be selected to have a uniform residence time, so the resulting packing structure assembly being made from modular units has a uniform residence time across a diameter of the resulting packing structure.

In an embodiment, a modular packing structure unit has a plate and channel orientation and arrangement as shown in FIG. 1, with a hexagonal outer wall and a diameter up to 100 mm. When the modular packing structure units have outer walls defined by different polygons so that the resulting packing structure assembly comprises a combination of tessellated polygons, a diameter of the packing structure assembly is two or more times of a diameter of a modular packing unit having a largest diameter. For example, when the modular packing structure units include octagon and square outer walls, the modular structured packing units having an octagon outer wall will have a diameter larger than the modular packing structure units having a square outer wall, so a diameter of the packing structure assembly will be two or more times a diameter of the modular packing structure units having an octagon outer wall. In an embodiment, the packing structure assembly itself forms a modular packing structure assembly module that can be combined with other modular packing structure assembly. In an embodiment, the modular packing structure assembly module has a diameter of 500 mm or less.

Each of the modular packing structure units can be considered a unit cell. Thus, a plurality of unit cells are combined to form a packing structure assembly. For the unit cells that are positioned at an edge, such as at a circumference, of the packing structure assembly, the unit cells may be smaller than that of the unit cells near the axis of the packing structure assembly. For example, and as best seen in FIG. 4, modular packing structure unit (e.g. edge cell) 207 is reduced in size when compared to central modular packing structure unit (e.g. central cell) 205 as unit 207 forms part of the outer wall 202. Put another way, edge cell 207 is a partial cell of central cell 205. Depending on the size and architecture of the edge cells, the edge cells may have closed channels depending on a location of the axis about which the channels rotate of these edge unit cells about. To prevent the formation of closed channels, in some embodiments the unit cells, such as edge cells, have an axis of rotation, about which the channels rotate, that is located at a centre or centroid of the partial cell.

Figure 5:
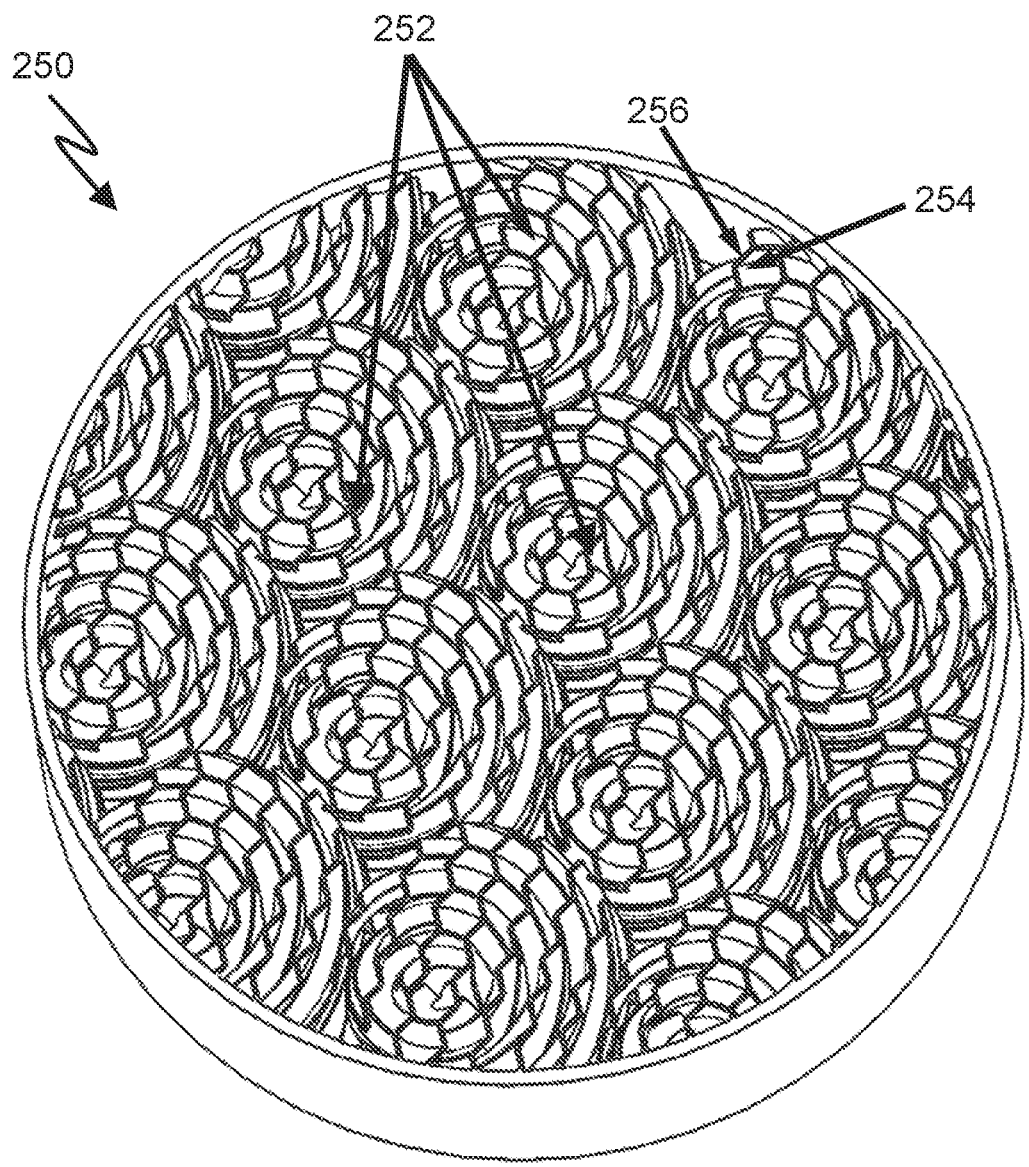
FIG. 5 shows another embodiment of a packing structure.

In some embodiments, a number of modular packing structures that are not tessellated are used to form a packing structure 250, as shown in FIG. 5. Each modular unit 252 is generally cylindrical although a wall is not used to delimit adjacent modular units 252 as in the embodiment of FIG. 4. Each modular unit is made up from a plurality of channels 254 formed in sheets 256. The plate and channel structure of the modular units in FIG. 5 helps to minimise retention time variations across the diameter of the packing structure 250. The modular design of FIG. 5 means that "scaling out" rather than "scaling up" helps to minimise uncertainty in going from laboratory scales to a full-sized plant.

FIGS. 19-23 and FIGS. 31-32 show embodiments of different packing structure architectures.

FIG. 19*a* and FIG. 19*b* shows a packing structure 600 that has two sets of sheets 604 and 606. The first set of sheets 606 are arranged transverse to the second set of sheets 606. Channels (e.g. channel or conduit) 602 are formed by the two sets of sheets. The sets of sheets 604 and 606 extend helically between the ends of the packing structure 600. As adjacent sheets of the first set of sheets 604 are connected together by the second set of sheets, the architecture shown in FIG. 19 has a 0 gap G. Although the channels 602 are shown as being square in FIG. 19, in some embodiments the channels 602 has a parallelogram arrangement. The architecture of FIG. 19 has a grid like cross section consisting of square channels.

FIGS. 20*a* and 20*b* shows a packing structure 610 having a series of circular channels (e.g. tubes or conduits) 612 that extend helically between the ends of the structure 610. The circular cross-section of the channels 612 provides a dense structure with the highest surface area per unit volume and provides comparatively smooth surfaces compared to corrugations.

FIG. 21*a* and FIG. 21*b* shows an embodiment of a packing structure 620 that is formed from corrugated sheets 626. At and radially near the axis of the packing structure 620 the apexes of the corrugated sheets are joined with connecting walls to form a honeycomb channels (e.g. conduits) 622. Radially outwards from the honeycomb channels 622 are provided elongate honeycomb channels (e.g. conduits) 624 where a connecting wall is omitted to combine two adjacent honeycomb channels. Radially outwards from the elongate honeycomb channels are channels (e.g. open channels) 628 similar to the arrangement shown in FIG. 1. Increasing the size of the channels extending in a radial direction helps to make a fluid residence time of the packing structure 620 be more uniform in cross section. A fluid residence time is usually lowest at the axis due to the steep flow path, but having the connecting walls near the axis help to increase the resistance to thereby increase the residence time.

Figure 22A:
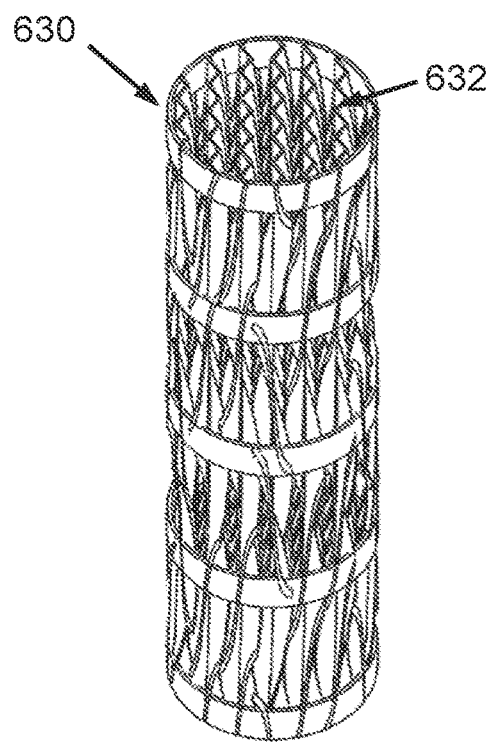
FIG. 22a show another embodiment of a packing structure.
Figure 22B:
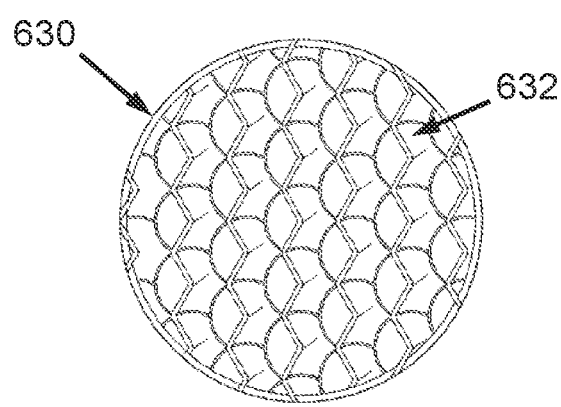

FIG. 22*a* and FIG. 22*b* show an embodiment of a packing structure 630. Packing structure 630 has a plurality of individual channel segments 632 that each rotate separately to one another in a helical arrangement. By rotating each channel segment 632 individually, the distance for fluid to travel through the packing structure is uniform along the cross section which promotes a more uniform velocity distribution.

Figure 23A:
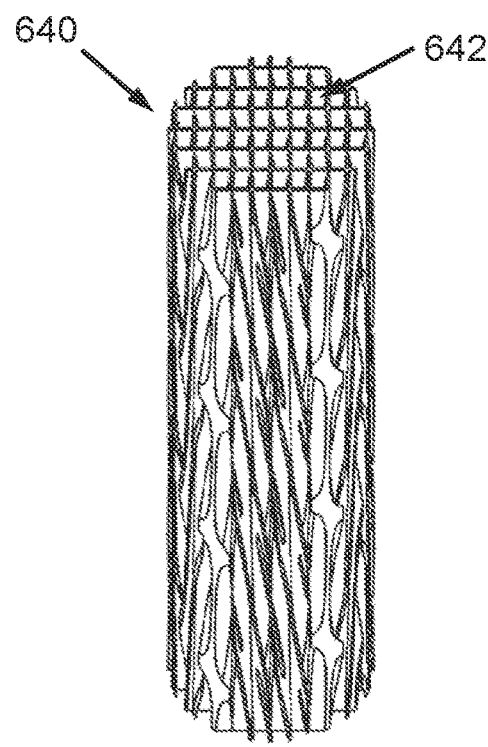
FIG. 23a shows another embodiment of a packing structure.
Figure 23B:
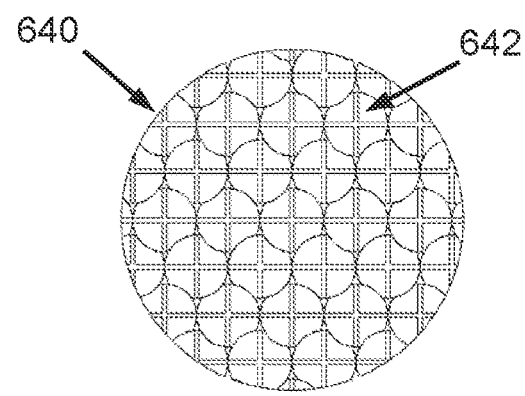

FIG. 23*a* and FIG. 23*b* show an embodiment of a packing structure 640. The packing structure 640 is similar to packing structure 630, except packing structure 640 has a first set of individual channel segments 642 and a second set of individual channel segments 644. The first and second channel segments 642 and 644 each have their own helical arrangement, where a double helix arrangement is formed between the first and second channel segments 642 and 644. Including the second set of individual channel segments 644 helps to increase a surface area of the packing structure 640 compared to packing structure 630.

Figure 31:
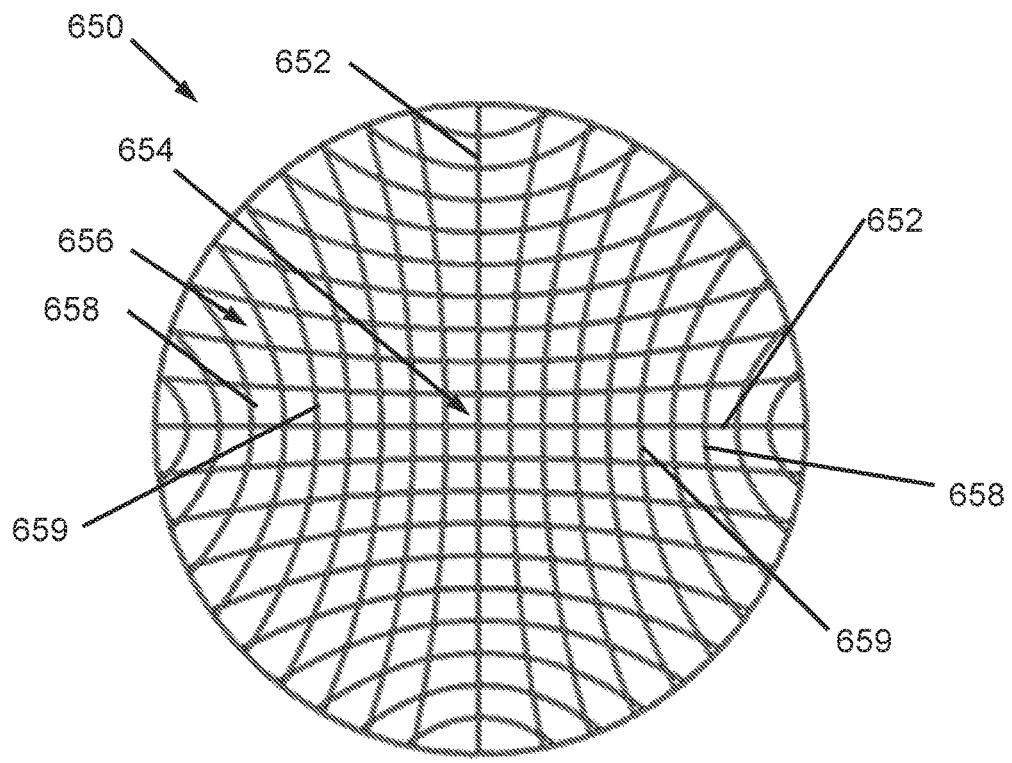
FIG. 31 shows another embodiment of a packing structure.

FIG. 31 shows another embodiment of a packing structure 650. Packing structure 650 has a pair of central plates (e.g. sheets) 652 that are arranged perpendicular relative one another and that are planar in cross-section. Each radially adjacent plate is curved having a curve that is defined by an increasingly smaller radius. For example, sheets 659 are defined by a larger radius compared to sheets 658 which are positioned radially outwards from sheets 659. The variation in curvature in the radial direction means that a channel (e.g. conduit) size increases in a radial direction. For example, channel 654 position immediately adjacent the central axis of the packing structure 650 is approximately square and has a smaller cross-sectional area compared to channel 656 positioned near the circumference of the packing structure 650. The architecture of packing structure 650 means that the fluid resistance decreases in a radial direction which slows the fluid flow rate near the axis where the sheets are angled the steepest, helping to provide a uniform residence time across the diameter of the packing structure 650. In an embodiment, the sheets of the packing structure 650 have a helical (helicoidal) structure.

Figure 32:
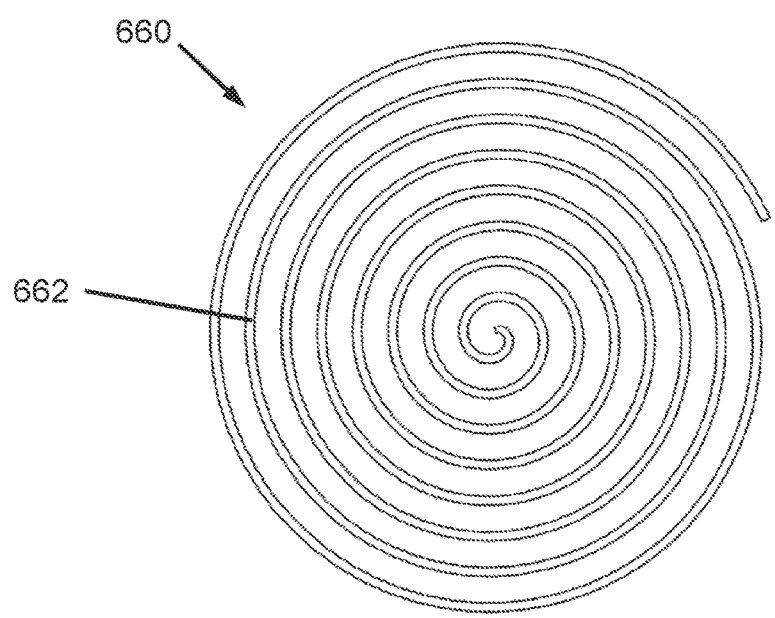
FIG. 32 shows another embodiment of a packing structure.

FIG. 32 shows another embodiment of a packing structure 660. Packing structure 660 has a sheet 662 that in cross-section adopts a Fermat's spiral or Archimedes spiral. The spiral architecture helps to increase a size of a channel formed between adjacent sheets extending in a radial direction. The sheet 662 has a helical arrangement. Thus, the channels or conduits defined by the sheet 662 have a helical flow path through the packing structure 660. Packing structure 660 can have a plurality of sheets 662 each extending from a central point. The central point may be at a central axis of the structure 660 or may alternatively be located radially displaced from the central axis.

In the embodiments of the packing structures shown in FIGS. 1-5, 7, 19-23 and 31-32, a length of the packing structures, segment lengths and rotation number is not limited to that depicted in these Figures.

In some embodiments, a conduit for passage of a heat exchange fluid is provided along at least a portion of the channels and/or sheets. The channels are generally formed of an inert material, such as stainless steel, having a thickness ranging from about 0.1 mm to about 1.0 mm.

In some embodiments a surface of the channels and/or sheets is modified to promote favourable conditions for e.g. mass transfer and reactions of fluids in the packing structure. Modification may include providing a hydrophilic/hydrophobic coating and providing one or more catalysts.

In some embodiments the structured packing, modular structured packing units and modular structured packing assembly are formed from plastics and/or metals.

Embodiments of the packing structure 10, 100, 150, 200, 250, 600, 610, 620, 630, 640, 650 and/or 660 may be used, either alone or as a combination of two or more structures, as a reactor and/or mass and/or heat transfer and/or separation(s) device, and in some embodiments two or more operations are performed, such as for reactive distillation. When two or more structures are used, the fluid flow path extending between the different structures may be curved and/or straight. In an embodiment, a straight flow path may extend from an embodiment of a structure e.g. from either side of a first and/or second end of the structure.

EXAMPLES

Embodiments will now be described with reference to the following non-limiting Examples.

Experimental Set-Up

Figure 10:
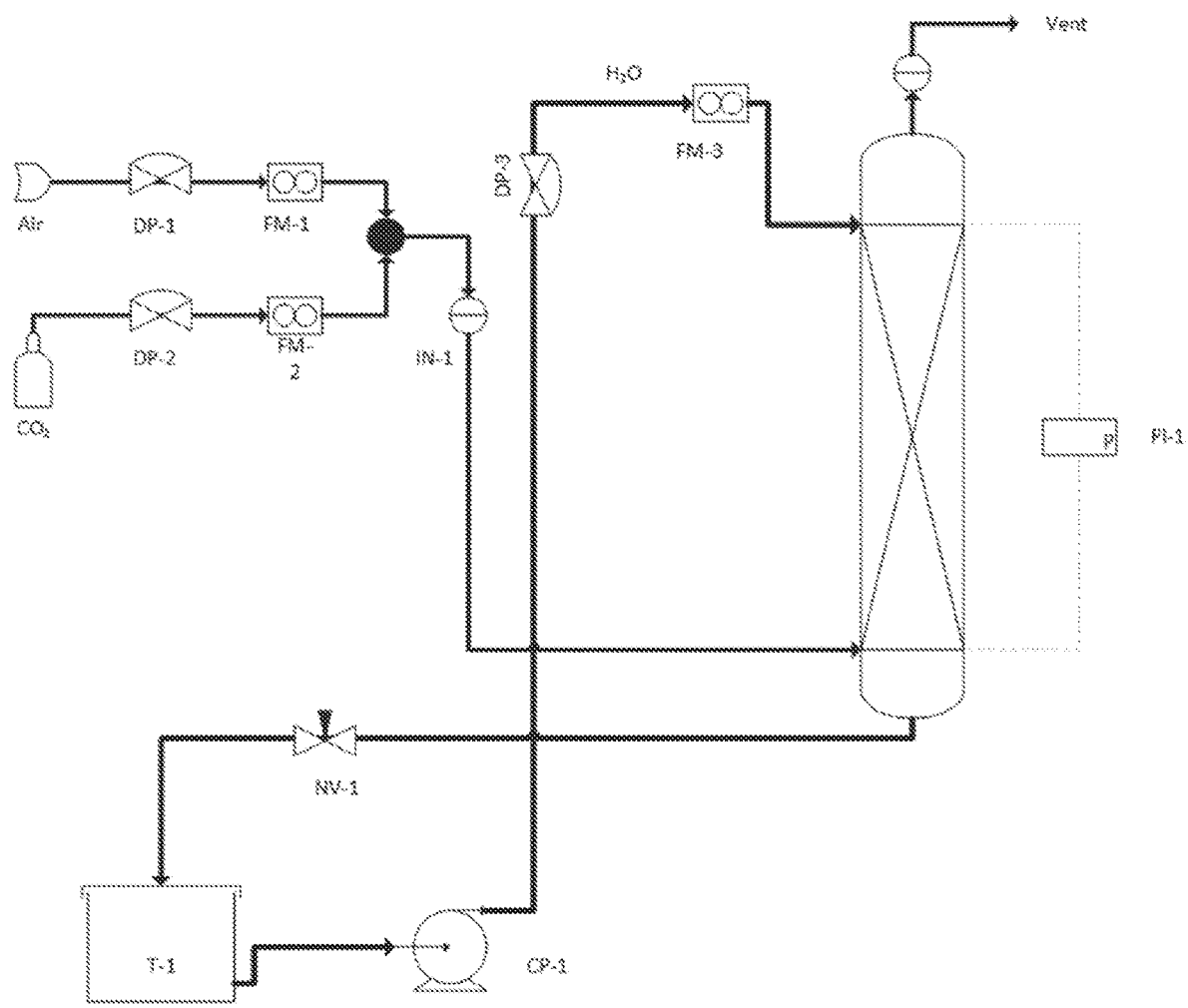
FIG. 10 shows an embodiment of a system used to test the performance of embodiments of packing structure and prior art structures.
Figure 14:
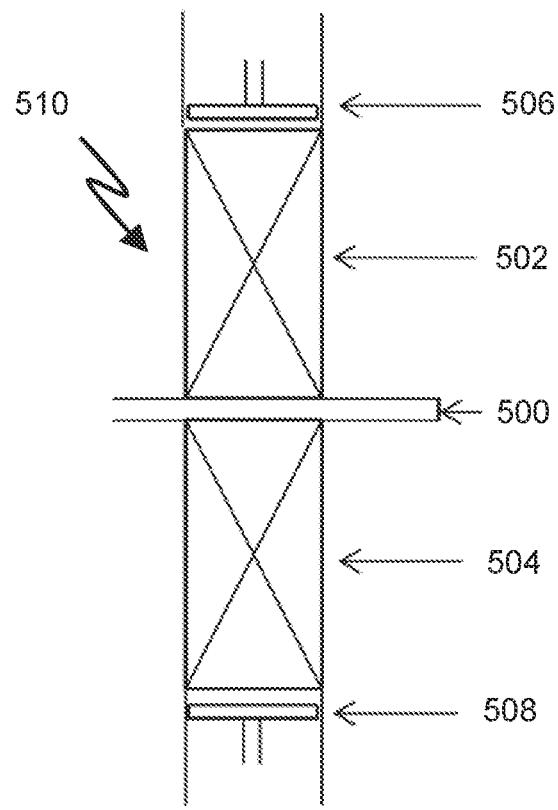
FIG. 14 shows an embodiment of a testing system used to test the performance of embodiments of packing structures and prior art structures.

The experimental studies were conducted in counter-current air-water systems at ambient conditions. The process flow diagram of the experimental set-up is shown in FIG. 10. Both vapour and liquid were fed using a 3D printed fractal distributor. The range of liquid loads and gas loads introduced to both systems were 25-75 $m^3/m^2 \cdot h$ and 0-0.2 $pa^{\wedge}0.5$, respectively. A typical packed column configuration is shown in FIG. 14. The structured packing used for the Examples had a diameter of 54 mm diameter, a length of 200 mm with Tan $\alpha=3/2$, and corrugated sheets having a segment length of 5 mm and gap of 5 mm (i.e. G=S) unless otherwise stated. The measurements were performed at the centre of the column and two elements were used for testing.

A wire mesh sensor (WMS) 500 was positioned between adjacent structure packing columns 502 and 504 (see FIG. 14) The columns 502 and 504 form a column structure 510. A liquid distributor 506 was positioned at the top of column 502 and a gas distributor 508 was positioned at the bottom of column 504. Gas was introduced into the column structure 510 through the gas distributor 508 so that gas flows upwards through the column structure, and liquid was introduced into the column structure 510 through the liquid distributor so that liquid flows down the column structure 510.

There are two measuring techniques on which the WMS instrument is based on. In 1998 Prasser et al. introduced a WMS system based on conductivity measurements. A new WMS was developed in 2007 by Da Silva et al. which was based on permittivity. The permittivity-based WMS is more favourable for measuring gas-liquid flow in a fixed bed as permittivity measurements present to be more advantageous than electrical conductivity measurements. This is largely due to the fact that organic liquids such as oil are not electrically conductive and therefore cannot be distinguished from other phases (eg: gas) using techniques which rely on resistance/conductivity (Matusiak, et al. 2010). The WMS enables instantaneous visualisation of flow cross-sections and therefore is advantages in examining instantaneous changes in gas-liquid flow. Permittivity values are calibrated for 100% vapour (ie: εv) and 100% liquid (ie: εl). During two-phase flow, a measured permittivity value 'εx' is obtained when a location contains neither pure vapour nor liquid. A mathematical model can be applied in order to determine the phase fraction at that particular location using a relationship between the measured and calibrated permittivity values (Da Silva, Schleicher and Hampel 2007). Therefore, the WMS allows for examination of phase fraction distribution based directly on local permittivity measurements. This proves more advantage than radiometric tomographic techniques requiring reconstruction algorithms which may introduce errors (Bieberle, et al. 2010).

WMS is conceptually simpler than other data acquisition techniques used for investigation of hydrodynamics, offering high temporal resolution, relatively low cost, good spatial resolution and direct local measurements instead of requiring algebraic reconstruction techniques (Da Silva, Schleicher and Hampel 2007).

Results

Figure 9:
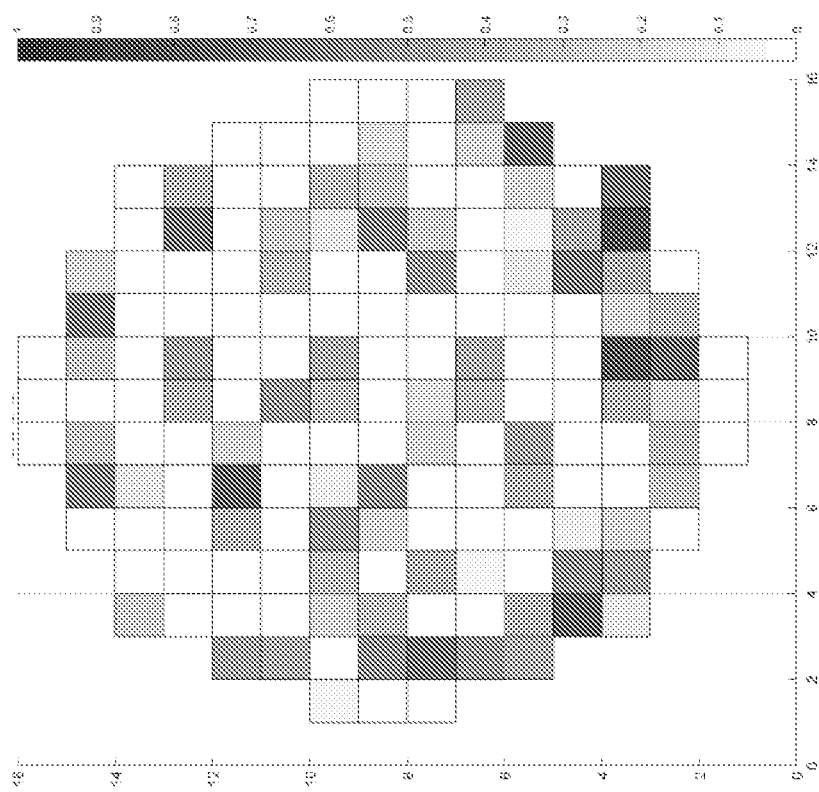
FIG. 9 shows fluid distribution across a cross-section an embodiment of the present disclosure.
Figure 8:
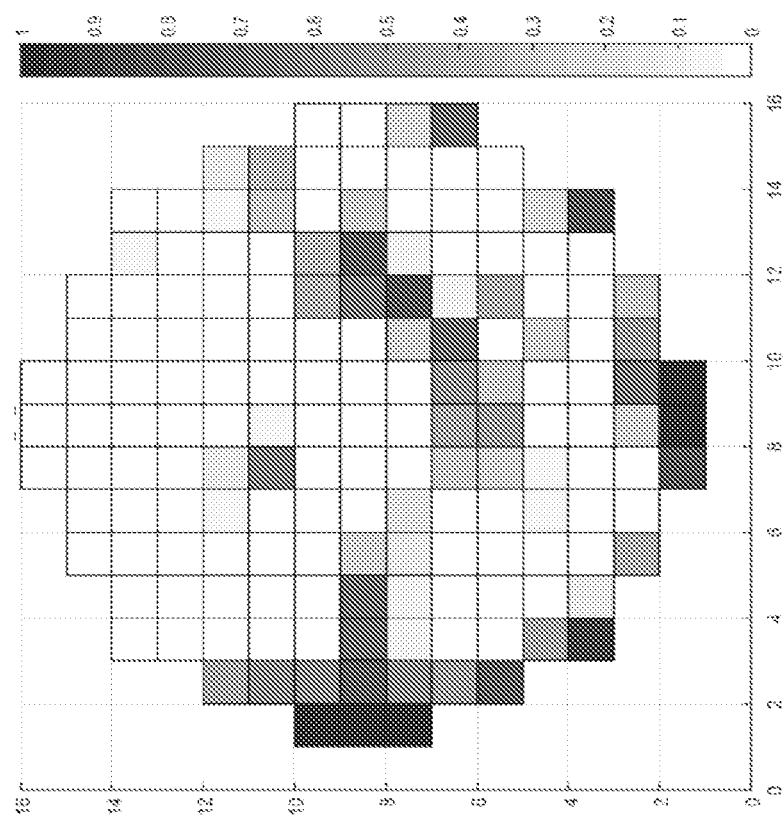
FIG. 8 shows fluid distribution across a cross-section of a prior art packing structure.

FIG. 8 shows a typical liquid distribution observed using a WMS in a 54 mm packing structure similar to the Mellpak (Sulzer, 2018; i.e. a conventional packing structure) and FIG. 9 shows typical liquid distribution for a 54 mm packing structure of an embodiment of the disclosure having a 5 mm segment length with Tan $\alpha=3/2$ using a WMS. The darkest colour indicates the water volume fraction of 1 and white is 0.

The data was collected for 20 sec and time averaged at the sampling rate of 10,000 hertz. Typical liquid load of 50 $m^3/m^2$ h and gas load of 0.2 $pa^{\wedge}0.5$ were used for this test.

FIG. 8 shows a liquid distribution for a conventional packing structure having a series of baffles orientated at 90° to one another, where liquid tends to pool and gather around a sidewall of the packing structure. In comparison, the liquid distribution shown in FIG. 9 has a much more uniform liquid distribution. This means that a surface area of the liquid flowing through the packing structure has a higher surface area which increases mass transfer etc.

Figure 11:
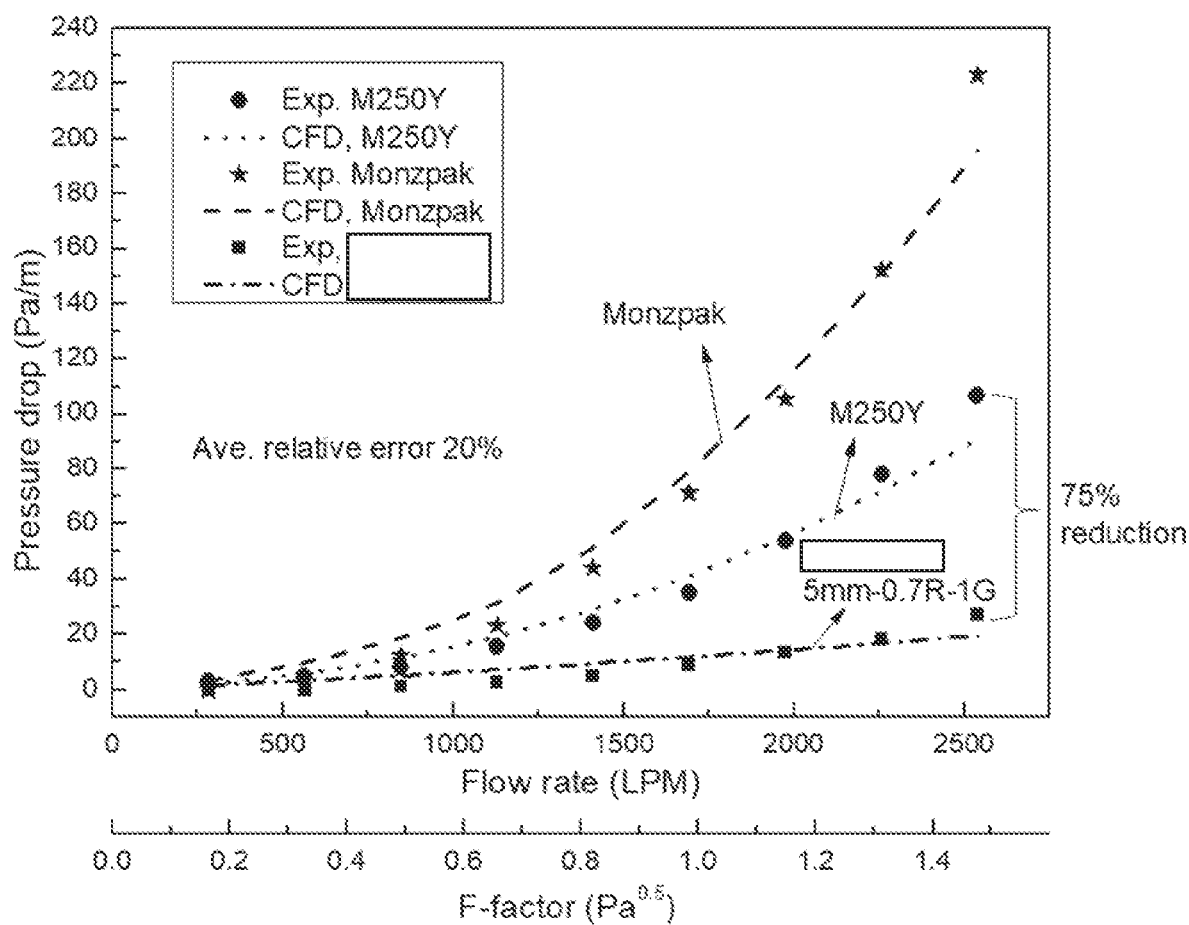
FIG. 11 shows comparative experimental and theoretical pressure drop results between an embodiment of the present disclosure and prior art structures.
Figure 12:
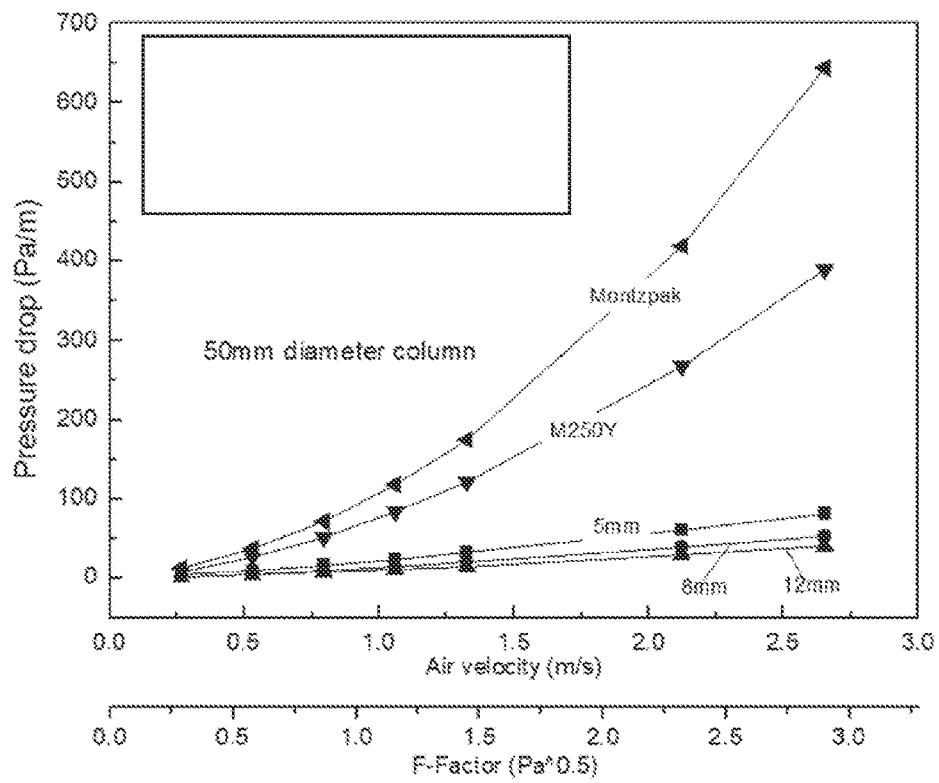
FIG. 12 shows comparative pressure drop results for various embodiments of the present packing structure having different segment lengths (mm) and prior art packing structures.
Figure 13:
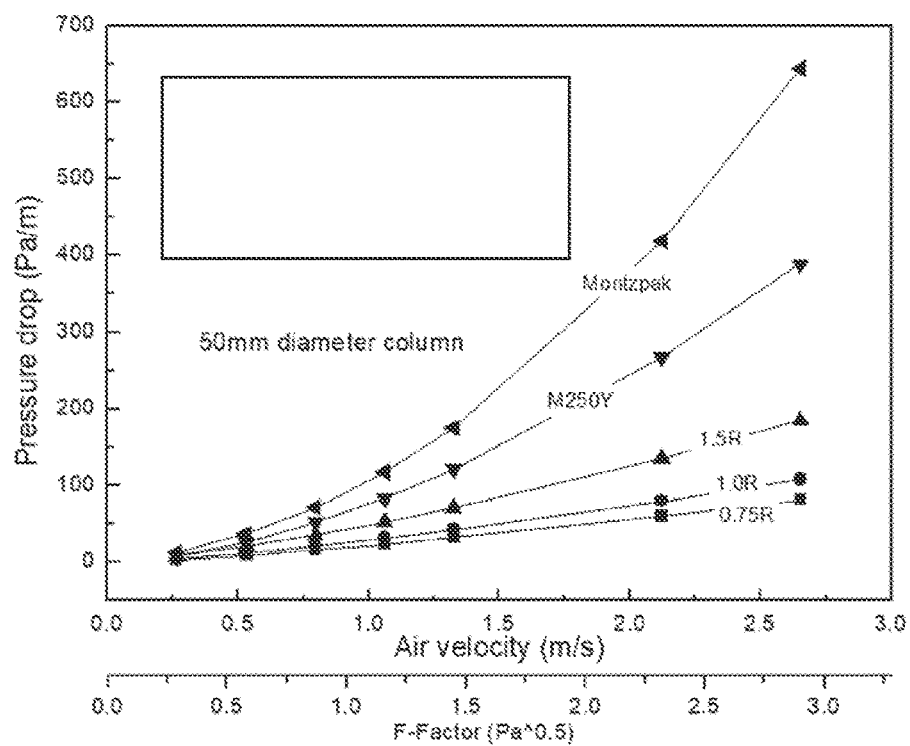
FIG. 13 shows comparative pressure drop results for various embodiments of the present packing structure having different number of rotations per unit length and prior art packing structures.

FIG. 11 shows a comparison of both experimental values and simulation values of different packing structures. Existing commercial packing structures (Mellapak 250Y and Monzpak) were provided as 3D-printed replicas. In contrast to existing commercial packing structures, an embodiment of a packing structure of the current disclosure can reduce the pressure drop by 75% approximately. FIG. 12 demonstrates the effect that segment length has on pressure drop for an embodiment of a packing structure of the disclosure having 0.75 rotation per unit length compared with conventional packing structures (Monzpak and Mellapak 250Y), and FIG. 13 demonstrates the effect that the number of revolutions have on pressure drop per unit length for an embodiment of a packing structure compared with conventional packing structures (Monzpak and Mellapak 250Y). Due to the geometry of the structure packing design, a higher gas and liquid contact and distribution rate can be achieved compared to Mellapak 250Y, which means that the embodiment of the structure packing in FIG. 11 had a higher efficiency than Mellapak 250Y.

Figure 24:
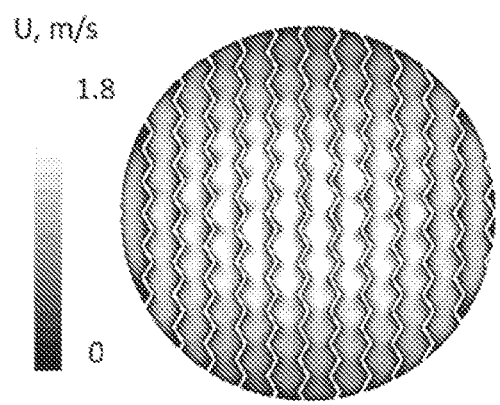
FIG. 24 shows a fluid mass flux heat map across a diameter of an embodiment of a packing structure having a diameter of 100 mm.
Figure 25:
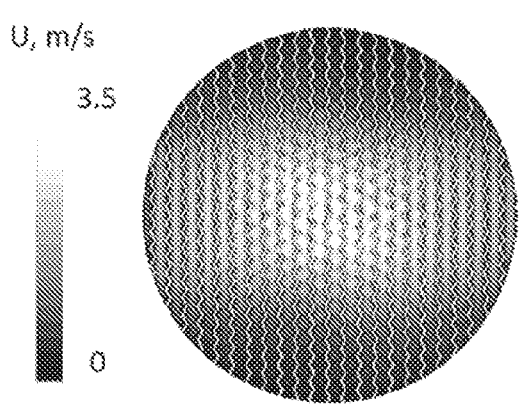
FIG. 25 shows a fluid mass flux heat map across a diameter of an embodiment of a packing structure having a diameter of 200 mm.

FIGS. 24 and 25 shows the effects of diameter on the fluid residence extending in a radial direction. FIG. 24 shows the residence time (in terms of fluid flow rate in m/s) of the packing structure of FIG. 1, where S=5 mm, G=S and 1 revolution per unit length, and a diameter of 100 mm, and FIG. 25 shows the residence time (in terms of fluid flow rate in m/s) of the packing structure of FIG. 1 where S=5 mm, G=S and 1 revolution per unit length, and a diameter of 200 mm. The residence time (i.e. flow rate) through a packing structure having a diameter of 100 mm is more uniform compared to the same packing structure with a diameter of 200 mm. Due to the relatively uniform residence time for a diameter of 100 mm, in some embodiments a diameter of a modular packing structure unit is 100 mm or less.

Figure 26:
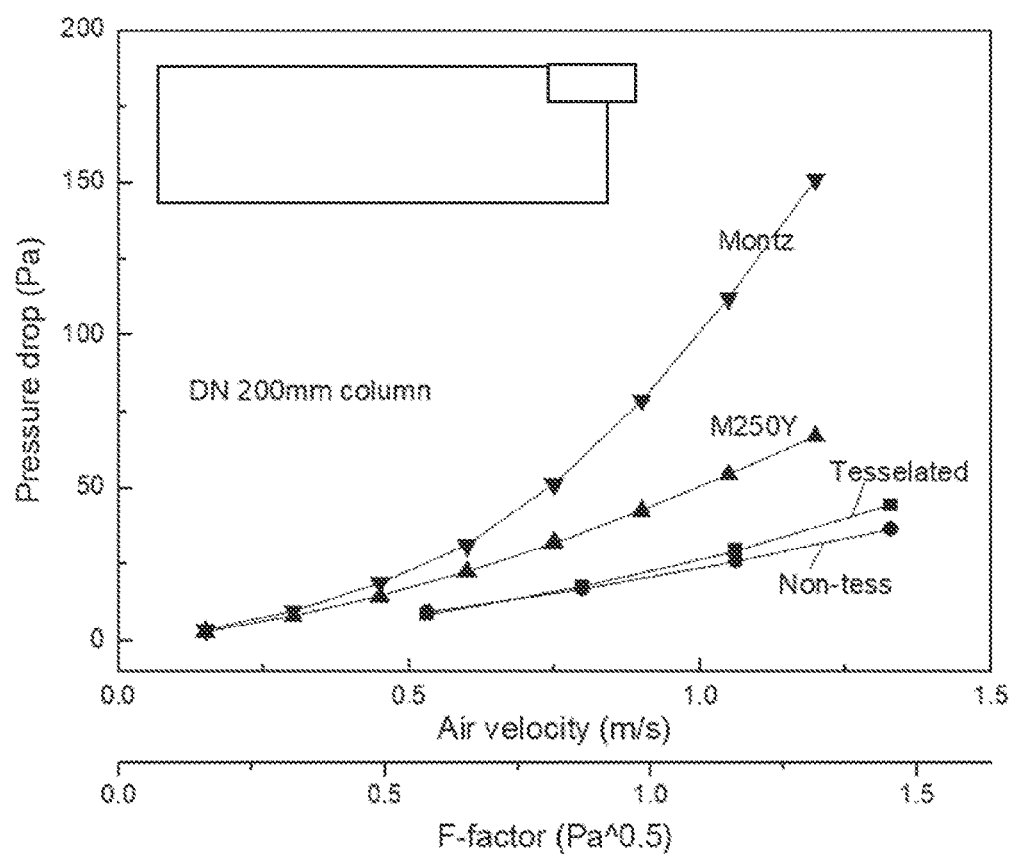
FIG. 26 shows pressure drop relationships of an embodiment of a packing structure having a diameter of 200 mm compared with an embodiment of a packing structure assembly having a diameter of 200 mm but being made from smaller modular units and comparative prior art structures.

FIG. 26 shows that the pressure drop for a structured packing assembly, having an overall diameter of 200 mm and that is formed from 100 mm modular structure packing units, is approximately the same as for a structure packing having a diameter of 200, and well below existing structure packing designs.

Figure 27:
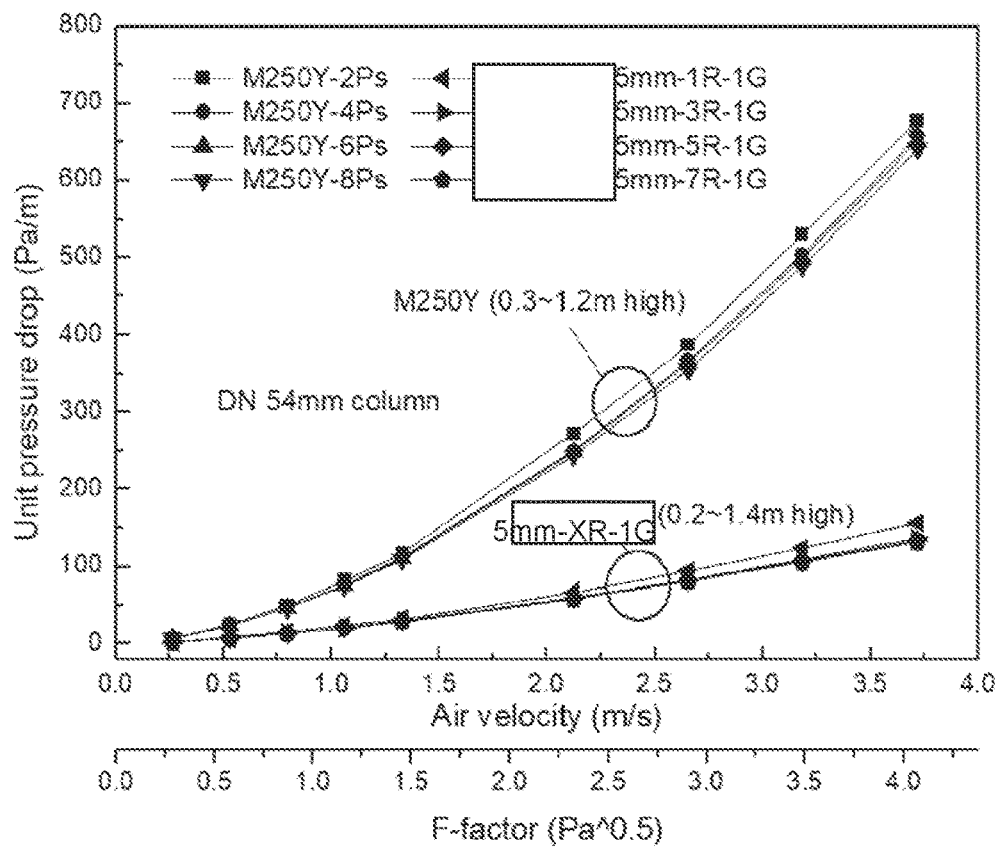
FIG. 27 shows pressure drop relationships for embodiments of a packing structure having different lengths and comparative prior art structures.

FIG. 27 shows the relationship of pressure drop and air velocity for an increase in length of the packing structure. Different packing structure lengths were formed from a unit length of 200 mm, a diameter of 54 mm, corrugated sheets having a segment length of 5 mm and a gap of 5 mm. Packing structure lengths of 200 mm, 600 mm, 1000 mm and 1400 mm were formed from the packing structure having a unit length of 100 mm. As seen in FIG. 27, the pressure drop of the various packing structure lengths formed from the packing structure unit length remains mostly unchanged, especially for lengths over 200 mm. Comparative samples were provided for Malpack M250Y having lengths of 300 mm, 600 mm, 900 mm and 1200 mm formed from a M250Y packing having a unit length of 150 mm and a diameter of 54 mm. The structures formed from the M250Y units had significantly higher pressure drop compared with embodiments of packing structure assemblies of the current disclosure.

Figure 29:
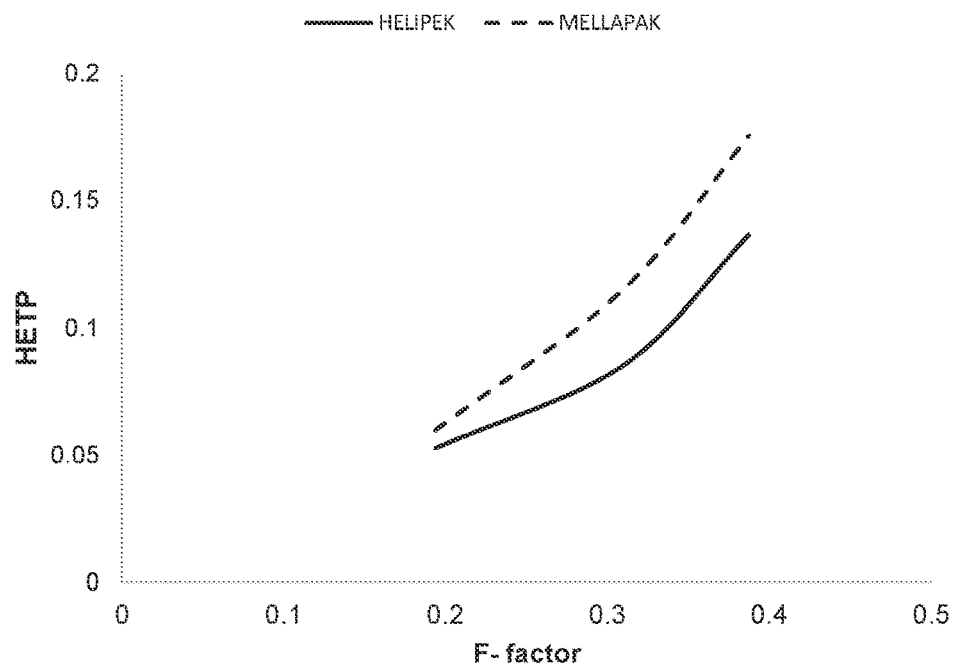
FIG. 29 shows a HETP plot of a packing structure of an embodiment of the disclosure compared with prior art packing structures.

FIG. 29 shows the measured height equivalent theoretical plate (HETP) values in m for varying F-factor (0.1-0.4 pa^0.5) at liquid flow rate of 12 LPM. The test was performed in the experimental set-up shown in FIG. 10. A mixture of air and $CO_2$ was used as a gas phase and water was used as a liquid phase. The amount of $CO_2$ absorbed in the gas phase was monitored and the amount of $CO_2$ absorbed in liquid phase was determined by performing acid-base titrations. The packing structure used for the tests shown in FIG. 29 had a diameter of 100 mm and corrugated sheets having a segment (S) length of 5 mm with 1 gap (i.e. G=S) and α=3/2. A comparative same was made with the replica of the Melalpak M250X. The results show that up to a 35% increase was observed in the mass transfer rate on the gas side for the packing structure when compared with the Mellapak M250X comparative sample and the overall HETP values reduced by up to 20% for the chosen flow rates.

Figure 30:
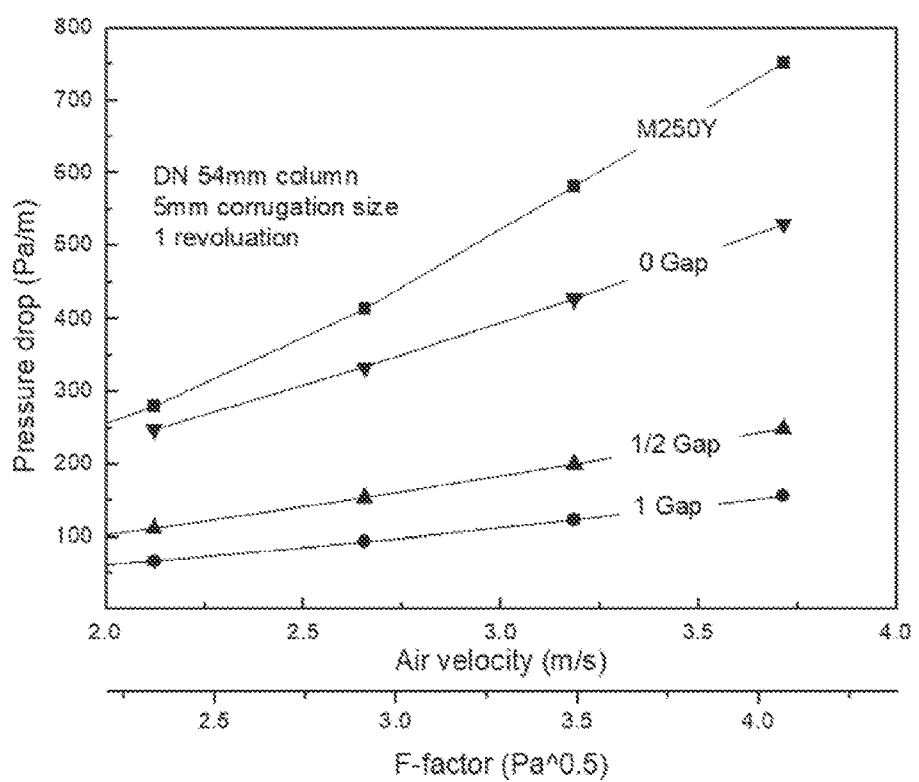
FIG. 30 shows the pressure drop relationships for embodiments of the disclosure structure having different gap sizes.

FIG. 30 is a graph that shows the relationship of pressure drop and gap size, along with a comparison to Mellapak M250Y packing. The packing structure has a diameter of 54 mm and corrugated sheets having a segment length of 5 mm. As the gap is decreased from 5 mm (1 gap), to 0.5 gap (2.5 mm) and 0 gap (a honeycomb structure due to the insertion of connecting walls), the pressure drop increases. This is partially explained by the increase in surface area, and thus an increase in fluid residence time, in the packing structure. At 1 gap the surface area is 316 $m^2/m^3$, at 0.5 gap the surface area is 445 $m^2/m^3$, and at 0 gap the surface area is 747 $m^2/m^3$. However, in all cases the pressure drop is less than Mellapak M250Y, yet the surface area of M250Y is significantly lower (231 $m^2/m^3$) than the embodiments of the packing structures used in FIG. 30.

In the claims which follow and in the preceding description except where the context requires otherwise due to express language or necessary implication, the word "comprise" or variations such as "comprises" or "comprising" is used in an inclusive sense, i.e. to specify the presence of the stated features but not to preclude the presence or addition of further features in the various embodiments described in the disclosure.

What is claimed is:

1. A structure that is used in the treatment of a fluid, comprising:
    a body having an axis;
    a plurality of curved fluid flow paths that rotate around the axis of the body, and extend continuously along at least a portion of the body,
    wherein the body comprises a plurality of sheets, each sheet having a helicoidal structure and forming a continuous surface that rotates around the axis of the body and extends along the at least a portion of the body,
    wherein the fluid flow paths are defined by the plurality of sheets,
    wherein each fluid flow path rotates around the axis with a constant radius, and
    wherein the sheets of the plurality of sheets are arranged approximately parallel to one another.

2. The structure of claim 1, wherein each fluid flow path is formed by or comprises a plurality of corrugations in the plurality of sheets.

3. The structure of claim 2, wherein adjacent sheets are arranged relative one another so that corrugations in one sheet face and are aligned with corrugations in an adjacent sheet to form respective fluid flow paths having the appearance of a hexagon without parallel side walls.

4. The structure of claim 1, wherein each fluid flow path comprises one or more walls that extend away from a surface of the plurality of sheets.

5. The structure of claim 1, wherein the body has a plurality of mutually isolated fluid flow paths.

6. The structure of claim 5, wherein the fluid flow paths are coaxially arranged.

7. The structure of claim 5, wherein the fluid flow paths are arranged linearly relative one another.

8. The structure of claim 6, wherein a wall delimits the mutually isolated fluid flow paths.

9. The structure of claim 1, wherein each fluid flow path is provided with one or more protrusions that increase a surface area of the flow path.

10. The structure of claim 1, wherein each fluid flow path is provided with one or more apertures.

11. The structure of claim 1, wherein a diameter of the structure is 100 mm or less.

12. The structure of claim 1, wherein the structure forms a modular structure unit, and wherein a plurality of modular structure units can be combined with one another to form a structure assembly.

13. The structure of claim 12, where a perimeter of the body is defined by a polygon such that adjacent bodies can be tessellated with one another to form the structure assembly.

14. A structure assembly comprising a plurality of the modular structure units of claim 12.

15. The structure assembly of claim 14, wherein a diameter of the structure assembly is at least two times a diameter of one of the plurality of modular structure units.

16. The structure assembly of claim 14, wherein a maximum diameter of the assembly is 500 mm or less.

* * * * *